(12) United States Patent
Hwang et al.

(10) Patent No.: US 12,363,211 B2
(45) Date of Patent: Jul. 15, 2025

(54) ELECTRONIC DEVICE INCLUDING ANTENNAS

(71) Applicant: Samsung Electronics Co., Ltd., Gyeonggi-do (KR)

(72) Inventors: Soonho Hwang, Gyeonggi-do (KR); Sungkoo Park, Gyeonggi-do (KR); Kyungjae Lee, Gyeonggi-do (KR); Sewoong Kim, Gyeonggi-do (KR); Seunghwan Kim, Gyeonggi-do (KR); Taeik Kim, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 337 days.

(21) Appl. No.: 17/890,483

(22) Filed: Aug. 18, 2022

(65) Prior Publication Data

US 2023/0046166 A1    Feb. 16, 2023

Related U.S. Application Data

(63) Continuation of application No. PCT/KR2022/011755, filed on Aug. 8, 2022.

(30) Foreign Application Priority Data

Aug. 9, 2021   (KR) .......................... 10-2021-0104349

(51) Int. Cl.
  *H04M 1/02*   (2006.01)
(52) U.S. Cl.
  CPC ....... *H04M 1/0245* (2013.01); *H04M 1/0216* (2013.01)
(58) Field of Classification Search
  CPC . H04L 41/0894; H04L 41/0895; H04L 41/40; H04W 4/50; H04W 48/08;
  (Continued)

(56) References Cited

U.S. PATENT DOCUMENTS 10,305,166 B2   5/2019   Kim et al.
10,418,689 B2   9/2019   Kim et al.
(Continued)

FOREIGN PATENT DOCUMENTS

KR   10-2017-0019838 A   2/2017
KR   10-2018-0137993 A   12/2018
(Continued)

OTHER PUBLICATIONS

International Search Report dated Nov. 17, 2022.

*Primary Examiner* — Nathan S Taylor
(74) *Attorney, Agent, or Firm* — Cha & Reiter, LLC

(57) ABSTRACT

According to an embodiment, an electronic device comprises: a foldable housing comprising a first housing hingably connected to a second housing, a first side member disposed about a side surface of the first housing and comprising a first plurality of conductive parts, and a second side member disposed about a side surface of the second housing and comprising a second plurality of conductive parts; a communication circuit electrically connected to a first conductive part among the first plurality of conductive parts and configured to transmit and receive a signal in a selected or specified frequency band; a first sensor integrated circuit (IC) electrically connected to at least one of the first plurality of conductive parts and configured to measure capacitance; a second sensor IC electrically connected to at least one of the second plurality of conductive parts and configured to measure capacitance; a first switching circuit electrically connected to the first conductive part and a second conductive part among the first plurality of conductive parts; and a processor and a memory, wherein the memory stores instructions that, when executed, cause the processor to perform a plurality of operations, the plurality of operations comprising: controlling the first switching circuit wherein the first conductive part and the second (Continued)

conductive part are electrically connected, based on at least one of the capacitance measured by the first sensor IC and the capacitance measured by the second sensor IC when the foldable housing is in a folded state.

14 Claims, 18 Drawing Sheets

(58) Field of Classification Search
CPC ..... H04W 48/12; H04W 48/18; H04W 72/23; H04M 1/0216; H04M 1/0245; H04M 1/026; H04M 1/0268; H04M 1/02; H01Q 1/243; H01Q 1/245; H01Q 21/28; H01Q 5/307; H01Q 9/42; G09F 9/30; G06F 1/16

See application file for complete search history.

(56) References Cited

U.S. PATENT DOCUMENTS

| | | | |
|---|---|---|---|
| 11,139,554 B2 | 10/2021 | Yoon et al. | |
| 11,201,635 B2 | 12/2021 | Chu et al. | |
| 2012/0196651 A1* | 8/2012 | Nakamura | H04B 7/0834 |
| | | | 455/566 |
| 2017/0047637 A1* | 2/2017 | Kim | H04W 4/70 |
| 2017/0102813 A1* | 4/2017 | Kuo | G06F 3/04166 |
| 2017/0373712 A1* | 12/2017 | Kim | H04B 7/0834 |
| 2019/0393918 A1* | 12/2019 | Han | G06V 10/143 |
| 2020/0136668 A1* | 4/2020 | Chu | G06F 1/1616 |
| 2020/0266524 A1* | 8/2020 | Yoon | G06F 1/1681 |
| 2021/0185164 A1* | 6/2021 | Jung | H01Q 1/42 |
| 2022/0115768 A1* | 4/2022 | Oh | H01Q 1/243 |
| 2022/0294099 A1* | 9/2022 | Choi | H04B 1/00 |
| 2022/0311126 A1* | 9/2022 | Hou | H01Q 1/243 |
| 2022/0417636 A1* | 12/2022 | Zhang | H01Q 1/273 |
| 2023/0029175 A1* | 1/2023 | Cho | H01Q 21/06 |
| 2023/0085202 A1* | 3/2023 | Fu | H01Q 1/243 |
| | | | 343/700 R |
| 2024/0380095 A1* | 11/2024 | Wang | H01Q 1/245 |

FOREIGN PATENT DOCUMENTS

| | | |
|---|---|---|
| KR | 10-2020-0049391 A | 5/2020 |
| KR | 10-2020-0100986 A | 8/2020 |
| KR | 10-2020-0101310 A | 8/2020 |
| KR | 10-2182633 B1 | 11/2020 |
| KR | 10-2021-0075834 A | 6/2021 |
| WO | 2021/145748 A1 | 7/2021 |

\* cited by examiner

ELECTRONIC DEVICE INCLUDING ANTENNAS

CLAIM OF PRIORITY

This application is a continuation of International Application No. PCT/KR2022/011755, filed on Aug. 8, 2022, which claims priority to Korean Patent Application No. 10-2021-0104349, filed on Aug. 9, 2021 in the Korean Intellection Property Office, which is incorporated by reference in its entirety for all purposes.

BACKGROUND

1. Technical Field

Certain embodiments of this document relate to an electronic device including an antenna.

2. Background Art

Electronic devices are using increased amounts of data. The increase in the use of such data is causing an increase of the network capacity. The use of a plurality of antennas can support various communication technologies.

As applications usable in the electronic devices diversify, the number of antennas included in the electronic devices is increasing. An exterior metal member may improve both the aesthetic appearance and durability of the electronic device. Moreover, the electronic device may use the exterior metal member as an antenna. When an electronic device transmits radio waves or receives external radio waves through a free space using an antenna, an external dielectric such as a hand carrying the electronic device may affect transmission/reception of the radio waves. The hand may degrade the radio waves.

Certain embodiments of the document of the disclosure may provide an electronic device including an antenna for reducing degradation in performance of transmission/reception of radio waves due to an external dielectric.

SUMMARY

According to an embodiment, an electronic device comprises: a foldable housing comprising a first housing hingably connected to a second housing, a first side member disposed about a side surface of the first housing and comprising a first plurality of conductive parts, and a second side member disposed about a side surface of the second housing and comprising a second plurality of conductive parts; a communication circuit electrically connected to a first conductive part among the first plurality of conductive parts and configured to transmit and receive a signal in a selected or specified frequency band; a first sensor integrated circuit (IC) electrically connected to at least one of the first plurality of conductive parts and configured to measure capacitance; a second sensor IC electrically connected to at least one of the second plurality of conductive parts and configured to measure capacitance; a first switching circuit electrically connected to the first conductive part and a second conductive part among the first plurality of conductive parts; and a processor and a memory, wherein the memory stores instructions that, when executed, cause the processor to perform a plurality of operations, the plurality of operations comprising: controlling the first switching circuit wherein the first conductive part and the second conductive part are electrically connected, based on at least one of the capacitance measured by the first sensor IC and the capacitance measured by the second sensor IC when the foldable housing is in a folded state.

According to an embodiments, an electronic device comprises: a foldable housing comprising a front surface of the electronic device, a rear surface of the electronic device positioned on an opposite side of the front surface, and a side surface of the electronic device surrounding a space between the front surface and the rear surface such that the front surface is foldable inward about a folding axis, and comprising a side member providing the side surface, and a plurality of conductive parts disposed on the side surface, the plurality of conductive parts including a first conductive part, a second conductive part, and a third conductive part; a communication circuit electrically connected to the first conductive part and configured to transmit and/or receive a signal in a selected or specified frequency band; a first switching circuit electrically connected to the first conductive part and the second conductive part; a first sensor integrated circuit (IC) electrically connected to the second conductive part and configured to measure capacitance; a second sensor IC electrically connected to the third conductive part, wherein the third conductive part is aligned with the second conductive part so as not to overlap the second conductive part, when the foldable housing is in a folded state, the second sensor IC and configured to measure capacitance; and a processor and a memory, wherein the memory stores instructions that, when executed, cause the processor to perform a plurality of operations, the plurality of operations comprising controlling the first switching circuit to electrically connect the first conductive part and the second conductive part, based on at least one of the capacitance measured by the first sensor IC and the capacitance measured by the second sensor IC in the folded state of the foldable housing.

DETAILED DESCRIPTION

An electronic device including an antenna according to certain embodiments of the disclosure may identify where the user's a hand grips the electronic device using a plurality of grip sensors (e.g., a plurality of capacitance sensors). Based on the result, the electronic device may determine at least a portion of an exterior metal member as an antenna radiator (or radiation part) to ensure the performance of transmission/reception of radio waves in a working frequency band, thereby securing specified performance in various usage environments.

In addition, effects that can be obtained or predicted from certain embodiments of this document will disclosed explicitly or implicitly in the detailed description of the embodiments of this document. For example, various effects predicted according to certain embodiments of this document will be disclosed in the detailed description to be described below.

Figure 1:
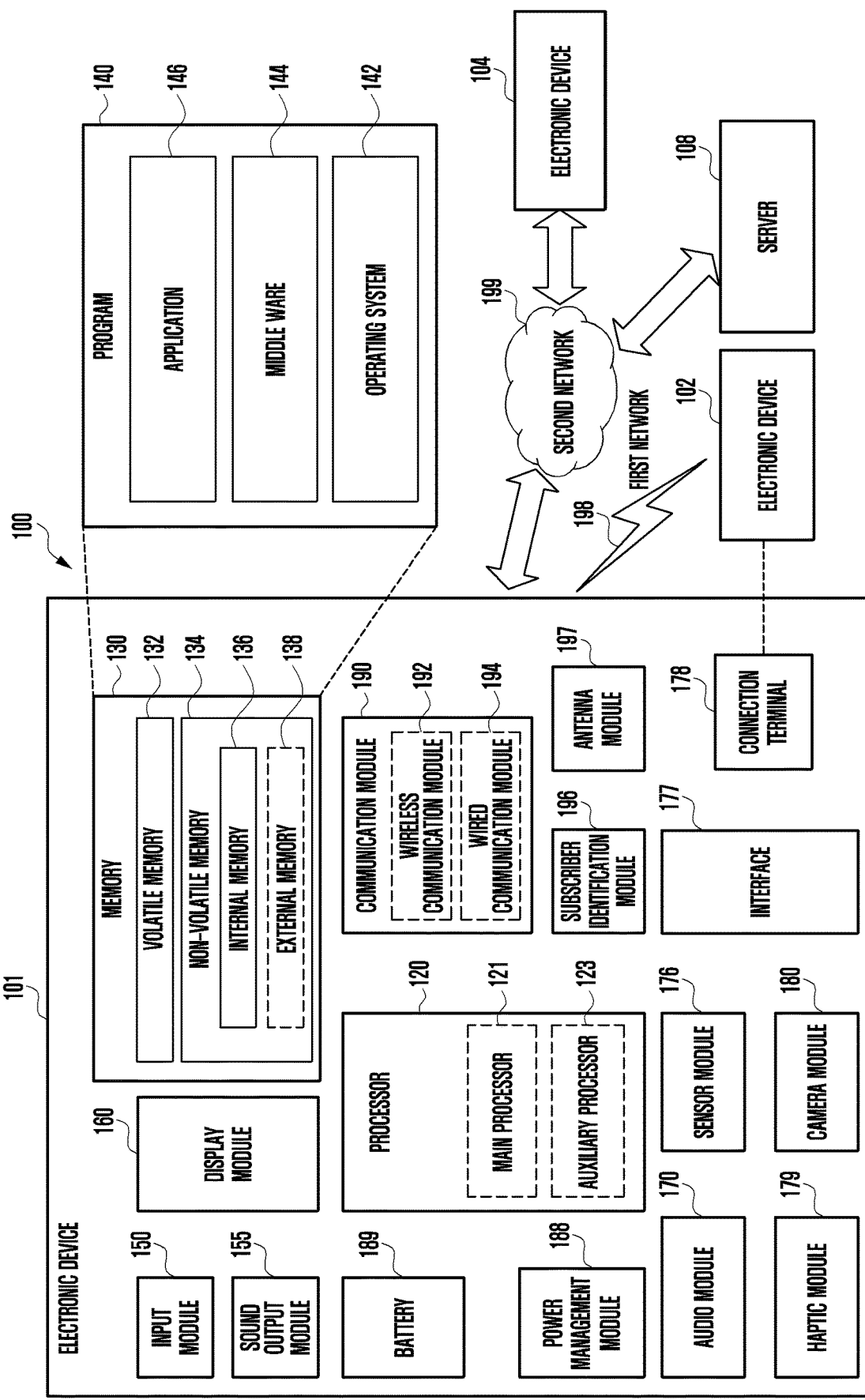
FIG. 1 is a block diagram of an electronic device in a network environment in an embodiment.

FIG. 1 describes an electronic device where certain embodiments of the disclosures can be practiced.

Electronic Device

Hereinafter, certain embodiments disclosed herein will be described with reference to the accompanying drawings.

FIG. 1 is a block diagram of an electronic device 101 in a network environment 100 according to an embodiment.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments of the disclosure, at least one (e.g., the connection terminal 178) of the components may be omitted from the electronic device 101, or one or more other components may be added in the electronic device 101. In some embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The term "processor" shall be understood to refer to both the singular and plural contexts in this document.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to certain embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In another embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Certain embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Certain embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY-STORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

A common dilemma that occurs with electronic devices is portability versus display size. In order for the electronic device 101 to be portable, it has to have small dimensions. Generally, it is desirable for the electronic device 101 to fit into the user's pocket.

However, the smaller size restricts the size of the display module 160. This deteriorates the user experience as user's generally enjoy larger screens.

A foldable device allows the user to enjoy both the portability and the larger screens. With foldable electronic device, the user can fold the electronic device, thereby reducing one of the dimensions when moving about. However, the user can unfold the electronic device when they are using it, thereby improving the user experience.

Foldable Housing

Figure 2:
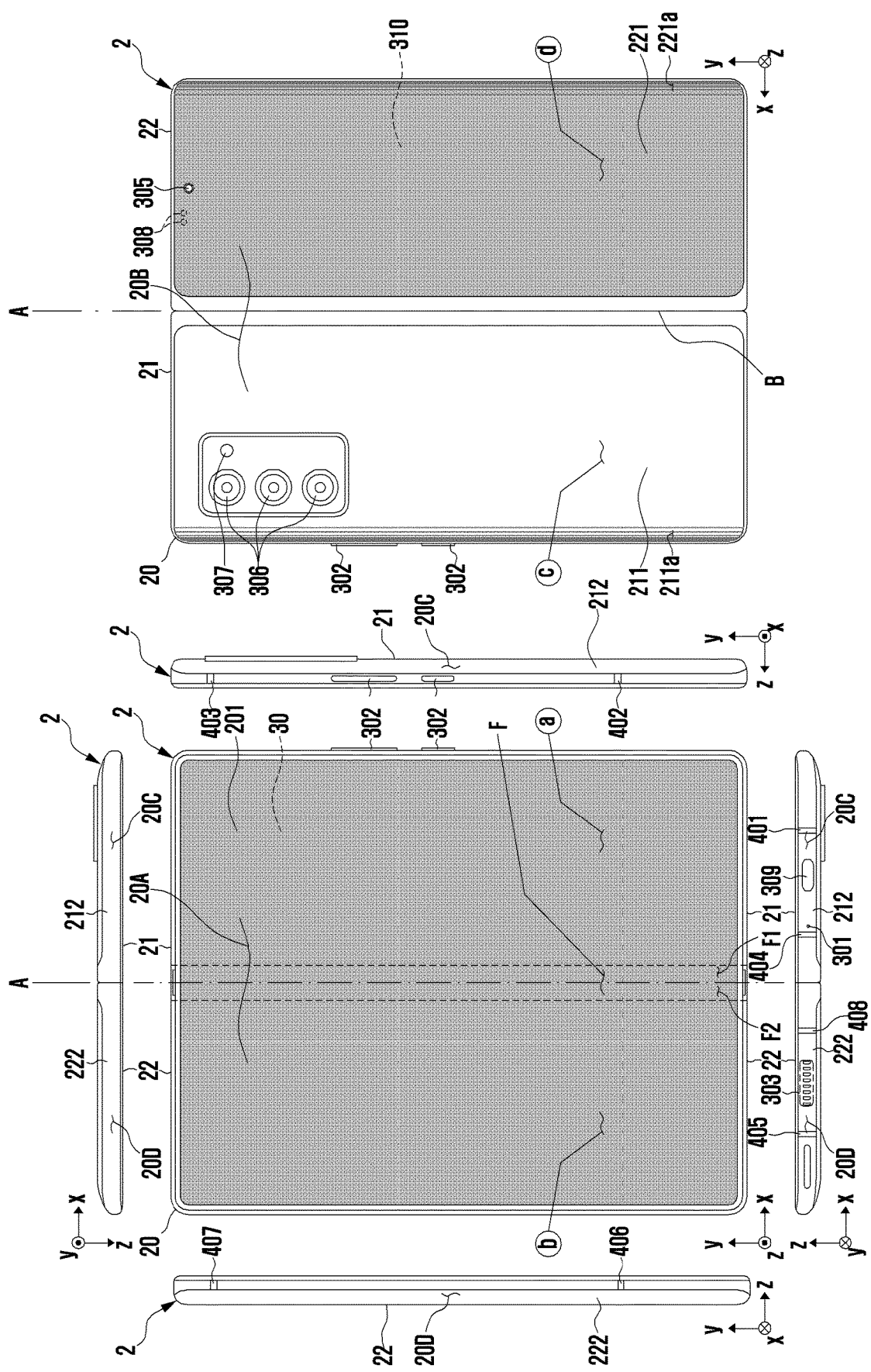
FIG. 2 is a diagram illustrating an electronic device in an unfolded state according to an embodiment.
Figure 3:
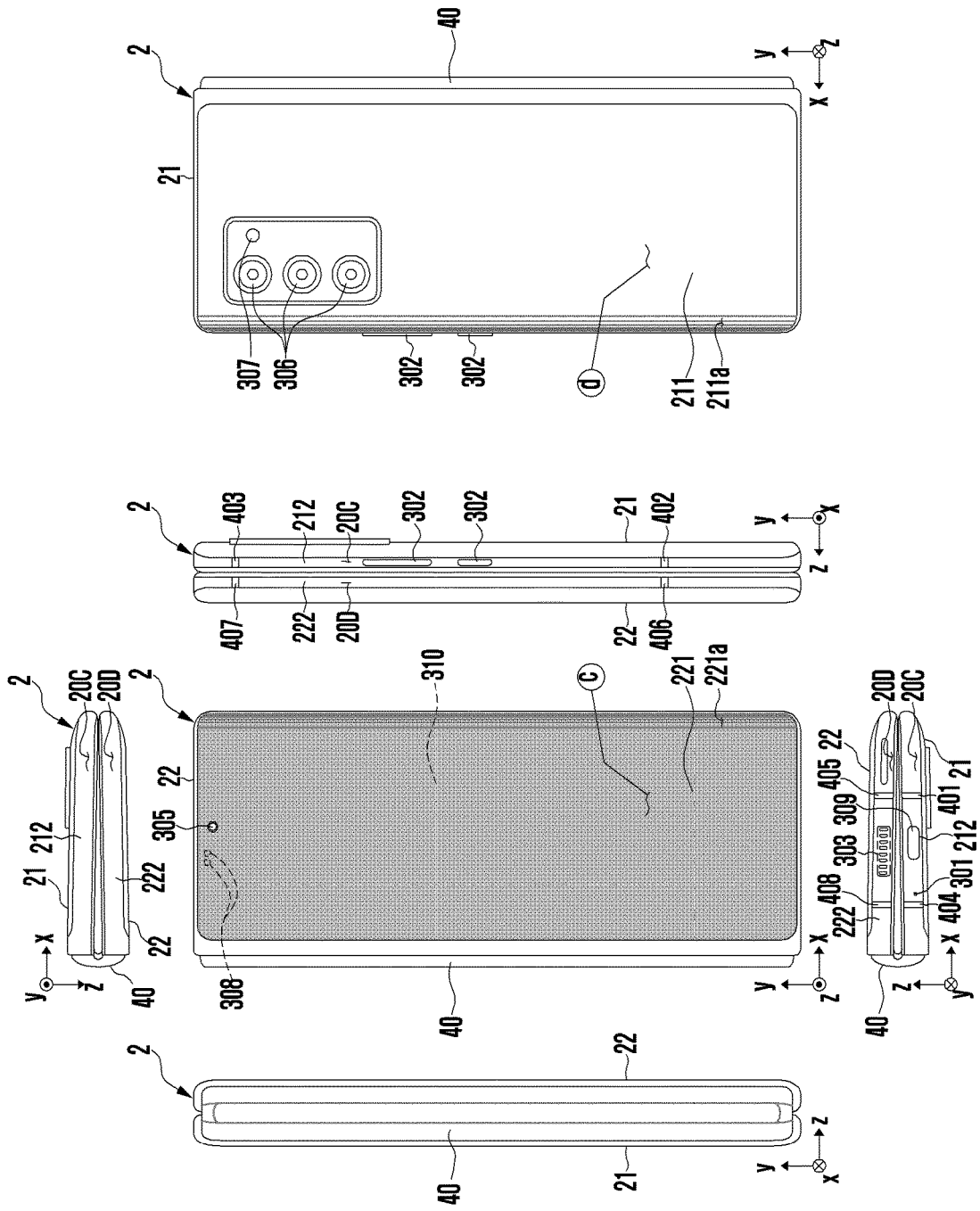
FIG. 3 is a diagram illustrating an electronic device in a folded state according to an embodiment.

FIG. 2 is a diagram illustrating an electronic device 2 in a flat or unfolded state according to an embodiment. FIG. 3 is a diagram illustrating an electronic device 2 in a folded state (or a folding state) according to an embodiment.

Referring to FIGS. 2 and 3, in an embodiment, the electronic device 2 may include a foldable housing 20. The foldable housing 20 may include a first surface 20A of the electronic device 2 and a second surface 20B of the electronic device 2, which is positioned on the opposite side of the first surface 20A. The foldable housing 20 may include a first side surface 20C and a second side surface 20D of the electronic device 2, which at least partially surround a space between the first surface 20A and the second surface 20B.

The first surface 20A may include a first cover area ⓐ, a second cover area ⓑ, and a folding cover area F between the first cover area ⓐ and the second cover area ⓑ. In an unfolded state of the foldable housing 20, the first surface 20A may be substantially planar, and the first cover area ⓐ, the second cover area ⓑ, and the folding cover area F may face in substantially the same direction. Moreover, the first cover area ⓐ, the second cover area ⓑ, and the folding cover area F may form one substantially continuous surface upon which a flexible display may be disposed.

The second surface 20B may include a third cover area ⓒ and a fourth cover area ⓓ. The third cover area ⓒ may be positioned on the opposite side of the first cover area ⓐ of the first surface 20A and face in the opposite direction of the first cover area ⓐ. The fourth cover area ⓓ may be positioned on the opposite side of the second cover area ⓑ of the first surface 20A and face in the opposite direction of the second cover area ⓑ.

In an embodiment, the foldable housing 20 may be implemented in an in-folding structure in which the first surface 20A is folded inward. For example, in the unfolded state of the foldable housing 20 (see FIG. 2), the folding cover area F may be arranged in a planar shape, and the first cover area ⓐ and the second cover area ⓑ may have an angle of about 180 degrees therebetween. In a folded state of the foldable housing 20 (see FIG. 3), the folding cover area F may be arranged in a curved shape, and the first cover area ⓐ and the second cover area ⓑ may have an angle therebetween, which is different from about 180 degrees. The folded state may include a fully folded state or an intermediate state. The fully folded state (see FIG. 3) may indicate the state in which the first cover area ⓐ and the second cover area ⓑ of the first surface 20A are folded to be closest to each other and, for example, in which the first cover area ⓐ and the second cover area ⓑ may form an angle of about 0 degrees to about 10 degrees therebetween. In the fully folded state, the first surface 20A may not be substantially exposed to the outside. The intermediate state may indicate a state between the unfolded state and the fully folded state. The folding cover area F of the first surface 20A may be more bent in the fully folded state than in the intermediate state. In an embodiment, the electronic device 2 may be implemented in an out-folding structure in which the first surface 20A (or a screen) is folded outwards.

The foldable housing 20 may include a front cover (e.g., a window) 201 that provides at least a portion of the first surface 20A. A flexible display 30 may be positioned in the inner space of the electronic device 2 so as to at least partially overlap the front cover 201. The front cover 201 may protect the flexible display 30 from the outside and may be substantially transparent. Light output from the flexible display 30 may pass through the front cover 201 and travel to the outside. The flexible display 30 may include, for example, a first display area (or first active area) overlapping the first cover area ⓐ of the first surface 20A, a second display area (or second active area) overlapping the second cover area ⓑ of the first surface 20A, and a third display area (or third active area) overlapping the folding cover area F. The screen may indicate an area capable of expressing an image in a device including the flexible display 30 and the front cover 201 and include, for example, the display area of the flexible display 30 and the area of the front cover 201 overlapping the same. In an embodiment, the front cover 201, as an element included in the flexible display 30, may be integrally formed with the flexible display 30.

The user can enjoy the larger flexible display 30 when the electronic device 2 is unfolded. When the user is carrying the electronic device 2, the user can fold the electronic device 2 as shown in FIG. 3. As can be seen, in FIG. 3, the x-dimension is approximately half of the dimension when the electronic device 2 is unfolded. When the electronic device 2 is folded, the flexible display 30 may not be visible to the user.

The front cover 201 may be implemented in the form of a thin film such as a film to have flexibility. The front cover 201 may include, for example, a plastic film (e.g., a polyimide film) or thin glass (e.g., ultra-thin glass (UTG)). In an embodiment, the front cover 201 may include a plurality of layers. For example, the front cover 201 may be configured such that a coating layer or a protective layer of various polymer materials (e.g., polyester (PET), polyimide (PI), or thermoplastic polyurethane (TPU)) is disposed on a plastic film or thin glass.

The foldable housing 20 may include a first housing (or first housing part or first housing structure) 21, a second housing (or second housing part or second housing structure) 22, and/or a hinge assembly (or hinge structure) (not shown). The first housing 21 and the second housing 22 are hingably connected to each other. The first housing 21 and the second housing 22 may be coupled by a hinge assembly and may be rotatable relative to each other based on a folding axis A (e.g., a rotation axis of the hinge assembly) of the foldable housing 20. The first housing 21 may include a first cover part of the front cover 201 positioned on one side of the folding axis A, a first rear cover 211 providing at least a portion of the third cover area ⓒ of the second surface 20B, and a first side member (or first side bezel structure) 212 that surrounds at least a portion of the space between the first cover part and the first rear cover 211 and provides a first side surface 20C. The first cover part of the front cover 201 may provide, for example, a first folding cover area F1 positioned on one side of the folding axis A, among the first cover area ⓐ and the folding cover area F. The second housing 22 may include a second cover part of the front cover 201 positioned on one side of the folding axis A, a second rear cover 221 providing at least a portion of the fourth cover area ⓓ of the second surface 20B, and a second side member (or side bezel structure) 222 that surrounds at least a portion of the space between the second cover part and the second rear cover 221 and provides the second side surface 20D. The second cover part of the front cover 201 may provide, for example, a second folding cover area F2 positioned on the other side of the folding axis A, among the second cover area ⓑ and the folding cover area F. In the fully folded state of the foldable housing 20, the first side member 212 and the second side member 222 may be aligned to be at least partially overlap each other. The first side member 212 and/or the second side member 222 may be formed of, for example, ceramic, polymer, metal (e.g., aluminum, stainless steel, or magnesium), or a combination of at least two of the above materials. The first side member 212 and/or the second side member 222 may include various metal materials such as titanium, amorphous alloys, metal-ceramic composite materials (e.g., cermet), stainless steel, magnesium, magnesium alloys, aluminum, aluminum alloys, zinc alloys, or copper alloys. The first rear cover 211 and/or the second rear cover 221 may be substantially opaque. The first rear cover 211 and/or the second rear cover 221 may be formed of, for example, coated or tinted glass, ceramic, polymer, metal (e.g., aluminum, stainless steel, or magnesium), or a combination of at least two of the above materials. The first rear cover 211 or the second rear cover 221 may include at least one coating layer disposed on a plate, using plates of various materials such as transparent glass, ceramic, or polymer, and coatings. As another example, the first rear cover 211 or the second rear cover 221 may include a plate of various materials such as transparent glass, ceramic, or polymer, and a film having various visual effects and attached to the plate (e.g., a decoration film). In an embodiment, the first rear cover 211 and the first side member 212 may be integrally formed and include the same material. In an embodiment, the second rear cover 221 and the second side member 222 may be integrally formed and include the same material.

The hinge assembly may include a hinge housing 40. The hinge housing 40 is an element that covers at least one hinge connecting the first housing 21 and the second housing 22, and may be referred to as a hinge cover in some embodiments. When the electronic device 2 switches from the folded state in FIG. 3 to the unfolded state in FIG. 2, the hinge housing 400 may cover the inside of the electronic device 2 so as not to be exposed while the gap B between the first housing 21 and the second housing 22 is opened. As shown in FIG. 2, in the fully unfolded state of the electronic device 2, the gap B may be substantially absent, and the hinge housing 40 may be covered by the first housing 21 and the second housing 22 so as not to be exposed to the outside. Although not shown, in the intermediate state, the hinge housing 40 may be partially exposed between the first housing 21 and the second housing 22. The hinge housing 40 may be more exposed in the folded state in FIG. 3 than in the intermediate state.

The foldable housing 20 may refer to a structure (e.g., a foldable housing structure or a foldable housing assembly) that provides at least a portion of the first surface 20A, the second surface 20B, the first side surface 20C, and the second side surface 20D. For example, the foldable housing 20 may include a first housing part, a second housing part, and a folding part coupled to the first housing part and the second housing part. The folding part may indicate a portion that is more flexible than the first housing part and the second housing part, and may be bent in the folded state of the electronic device 2. The folding part may include, for example, a hinge assembly. As another example, the folding part may include a structure in which a plurality of bars is arranged (e.g., a multi-bar structure) and, not limited thereto, may be implemented in various other structures capable of connecting the first housing part and the second housing part and providing a bendable feature.

The electronic device 2 may include a display (hereinafter, a sub-display) 310 positioned inside the first housing 21 to be adjacent to the first rear cover 211. A portion of the first rear cover 211 may overlap the sub-display 310 and may be substantially transparent. The electronic device 2 may output an image using the sub-display 310, instead of the flexible display 30, in the folded state shown in FIG. 3.

The second rear cover 221 may include a second curved area 221a that seamlessly extend to be bent from the fourth cover area ⓓ toward the second cover area ⓑ. The second curved area 221a may be provided adjacent to the long edge of the second rear cover 221 substantially parallel to the folding axis A. The sub-display 310 may include a flexible display that may be disposed in a shape corresponding thereto.

The first rear cover 211 may include a first curved area 211a that seamlessly extend to be bent from the third cover area ⓒ toward the first cover area ⓐ. The first curved area 211a may be provided adjacent to the long edge of the first rear cover 211 substantially parallel to the folding axis A. For example, in the unfolded state (see FIG. 2) or the folded state (see FIG. 3) of the electronic device 2, for the sake of aesthetics, the first curved area 211a and the second curved area 221a may be positioned on the opposite sides to be substantially symmetrical. In an embodiment, the first curved area 211a or the second curved area 221a may be omitted.

The electronic device 2 may be, for example, the electronic device 101 in FIG. 1 or may include at least one of the elements included in the electronic device 101 in FIG. 1. In an embodiment, the electronic device 2 may include an input module (e.g., the input module 150 in FIG. 1), a sound output module (e.g., the sound output module 155 in FIG. 1), a camera module (e.g., the camera module 180 in FIG. 1), a sensor module (e.g., the sensor module 176 in FIG. 1), or a connection terminal (e.g., the connection terminal 178 in FIG. 1). In an embodiment, the electronic device 2 may exclude at least one of the elements or further include other elements. The positions or number of elements included in the electronic device 2 is not limited to the illustrated example and may vary.

The input module may include, for example, a microphone positioned inside the electronic device 2, and a microphone hole 301 provided on the first side surface 20C to correspond to the microphone. The positions or number of the input modules including the microphone and the microphone hole 301 corresponding thereto is not limited to the illustrated example and may vary. In an embodiment, the electronic device 2 may include a plurality of microphones capable of detecting the direction of sound.

The input module may include, for example, key input devices 302. The key input devices 302 may be positioned, for example, in an opening (not shown) provided in the first side surface 20C. In an embodiment, the electronic device 2 may exclude some or all of the key input devices 302, and the excluded key input devices may be implemented as soft keys using the flexible display 30 or sub-display 310. In an embodiment, the input module may include at least one sensor module.

The sound output module may include, for example, a speaker positioned inside the electronic device 2, and a speaker hole 303 provided in the second side surface 20D to correspond to the speaker. The positions or number of the sound output modules including the speaker and the speaker hole 303 corresponding thereto is not limited to the illustrated example and may vary. In an embodiment, the microphone hole 301 and the speaker hole 303 may be implemented as one hole. In an embodiment, a piezo speaker, excluding the speaker hole 303, may be implemented. The sound output module may include, for example, a receiver for calls positioned inside the electronic device 2 and a receiver hole (not shown) provided in the fourth cover area ⓓ to correspond to the receiver for calls.

The camera module may include, for example, a first camera module (or front camera module) 305 positioned to correspond to the fourth cover area ⓓ, or a plurality of second camera modules (or rear camera modules) 306 positioned to correspond to the third cover area ⓒ. The first camera module 305 and/or the plurality of second camera modules 306 may include one or more lenses, an image sensor, and/or an image signal processor. The positions or number of the first camera module 305 or the plurality of second camera modules 306 is not limited to the illustrated example and may vary.

The sub-display 310 may include an opening aligned with the first camera module 305. External light may pass through the openings of the second rear cover 221 and the sub-display 310 to reach the first camera module 305. In an embodiment, the opening of the sub-display 310 may be provided in the form of a notch depending on the position of the first camera module 305. In an embodiment, the first camera module 305 may be positioned on the back surface of the sub-display 310, or below or beneath the sub-display 310 so that the first camera module 305 may perform a related function (e.g., photographing images) while the position thereof is not visually distinct (or exposed). For example, the first camera module 305 may include a hidden camera below the display (e.g., an under-display camera (UDC)). In an embodiment, the first camera module 305 may be positioned to be aligned with a recess provided on the back surface of the sub-display 310. The first camera module 305 may be disposed to overlap at least a portion of the screen to obtain an image of an external subject without being visually exposed to the outside. In this case, a partial area of the sub-display 310 that at least partially overlaps the first camera module 305 may include a pixel structure and/or a wiring structure, which is different from other areas. For example, a partial area of the sub-display 310 overlapping the first camera module 305 may have a pixel density different from those of other areas. The pixel structure and/or the wiring structure provided in a partial area of the sub-display 310, which at least partially overlaps the first camera module 305, may reduce light loss between the outside and the first camera module 305. In an embodiment, pixels may not be disposed in a partial area of the sub-display 310, which at least partially overlaps the first camera module 305.

The plurality of second camera modules 306 may have different properties (e.g., angle of view) or functions from each other, and include, for example, a dual camera or a triple camera. The plurality of second camera modules 306 may include a plurality of camera modules including lenses having different angles of view, and the electronic device 2 may perform control such that the angle of view of the camera module performed in the electronic device 2 changes based on user's selection. The plurality of second camera modules 306 may include at least one of a wide-angle camera, a telephoto camera, a color camera, a monochrome camera, or an IR (infrared) camera (e.g., a time-of-flight (TOF) camera or a structured light camera). In an embodiment, the IR camera may operate as at least portion of the sensor module. The electronic device 2 may include a flash 307 as a light source for the plurality of second camera modules 306. The flash 307 may include, for example, a light-emitting diode or a xenon lamp.

The sensor module may generate an electrical signal or data value corresponding to an internal operation state of the electronic device 2 or an external environmental state. The sensor module may include, for example, at least one of a proximity sensor, a gesture sensor, a gyro sensor, an atmospheric pressure sensor, a magnetic sensor, an acceleration sensor, a grip sensor, a color sensor, an infrared (IR) sensor, a biometric sensor (e.g., a fingerprint sensor or an HRM sensor), a temperature sensor, a humidity sensor, or an illuminance sensor.

The sensor module may include an optical sensor 308 positioned inside the electronic device 2 to correspond to the fourth cover area ⓓ. The optical sensor 308 may include, for example, a proximity sensor or an illuminance sensor. The optical sensor 308 may be aligned with the opening provided in the sub-display 310. External light may pass through the openings of the second rear cover 221 and the sub-display 310 to reach the optical sensor 308. In an embodiment, the optical sensor 308 may be positioned on the back surface of the sub-display 310, or below or beneath the sub-display 310 so that the optical sensor 308 may perform a related function (e.g., photographing images) while the position thereof is not visually distinct (or exposed). In an embodiment, the optical sensor 308 may be positioned to be aligned with a recess provided in the back surface of the sub-display 310. The optical sensor 308 may be disposed to overlap at least a portion of the screen and execute a sensing function without being exposed to the outside. In this case, a partial area of the sub-display 310 at least partially overlapping the optical sensor 308 may include a pixel structure and/or a wiring structure different from those in other areas. For example, a partial area of the sub-display 310 at least partially overlapping the optical sensor 308 may have a pixel density different from those of other areas. In an embodiment, the sensor module may include a fingerprint sensor (not shown) positioned below the sub-display 310. The fingerprint sensor may be implemented by a capacitive method, an optical method, or an ultrasonic method. The pixel structure and/or the wiring structure provided in the partial area of the sub-display 310 at least partially overlapping the sensor module may reduce loss of various types of signals (e.g., light or ultrasound) related to the sensor module when the signals pass between the outside and the sensor module. In an embodiment, a plurality of pixels may not be disposed in a partial area of the sub-display 310 at least partially overlapping the sensor module.

The connection terminal may include, for example, a connector (e.g., a USB connector) positioned inside the electronic device 2. The electronic device 2 may include a connector hole 309 corresponding to the connector and provided in the first side surface 20C. The electronic device 2 may transmit and/or receive power and/or data to and/or from an external electronic device electrically connected to the connector through the connector hole 309. The positions or number of the connectors and the connector holes 309 corresponding thereto is not limited to the illustrated example and may vary.

The electronic device 2 may include a detachable pen input device (e.g., an electronic pen, a digital pen, or a stylus pen) (not shown). For example, the pen input device may be detachably attached to the hinge housing 40. The hinge housing 40 may include a recess into which the pen input device may be inserted. The pen input device may be attached to and detached from the recess of the hinge housing 40 exposed to the outside in the folded state (see FIG. 3) or intermediate state of the electronic device 2. In an embodiment, the electronic device 2 may be implemented such that the pen input device can be inserted into the inner space of the first housing 21 or second housing 22.

The electronic device 2 may transmit and/or receive a signal in a selected or specified frequency band using at least some of a first plurality of conductive parts included in the first side member 212 or at least some of a second plurality of conductive parts included in the second side member 222. The first plurality of conductive parts may be disposed on the side surface of the first housing 21. The second plurality of conductive parts may be disposed on the side surface of the second housing 22. The plurality of conductive parts included in the first side member 212 (first plurality of conductive parts) may be positioned to be separated by, for example, a plurality of insulating parts 401, 402, 403, and 404 included in the first side member 212. The plurality of conductive parts included in the second side member 222 (second plurality of conductive parts) may be positioned to be separated by, for example, a plurality of insulating parts 405, 406, 407, and 408 included in the second side member 222.

Electronic devices are using increased amounts of data. The increase in the use of such data is causing an increase of the network capacity. Accordingly, the antenna module 197 can include a plurality of antennas to support various communication technologies.

As applications usable in the electronic devices diversify, the number of antennas included in the electronic devices is increasing. An exterior metal member may improve both the aesthetic appearance and durability of the electronic device. Moreover, the electronic device may use the exterior metal member as an antenna.

Figure 4:
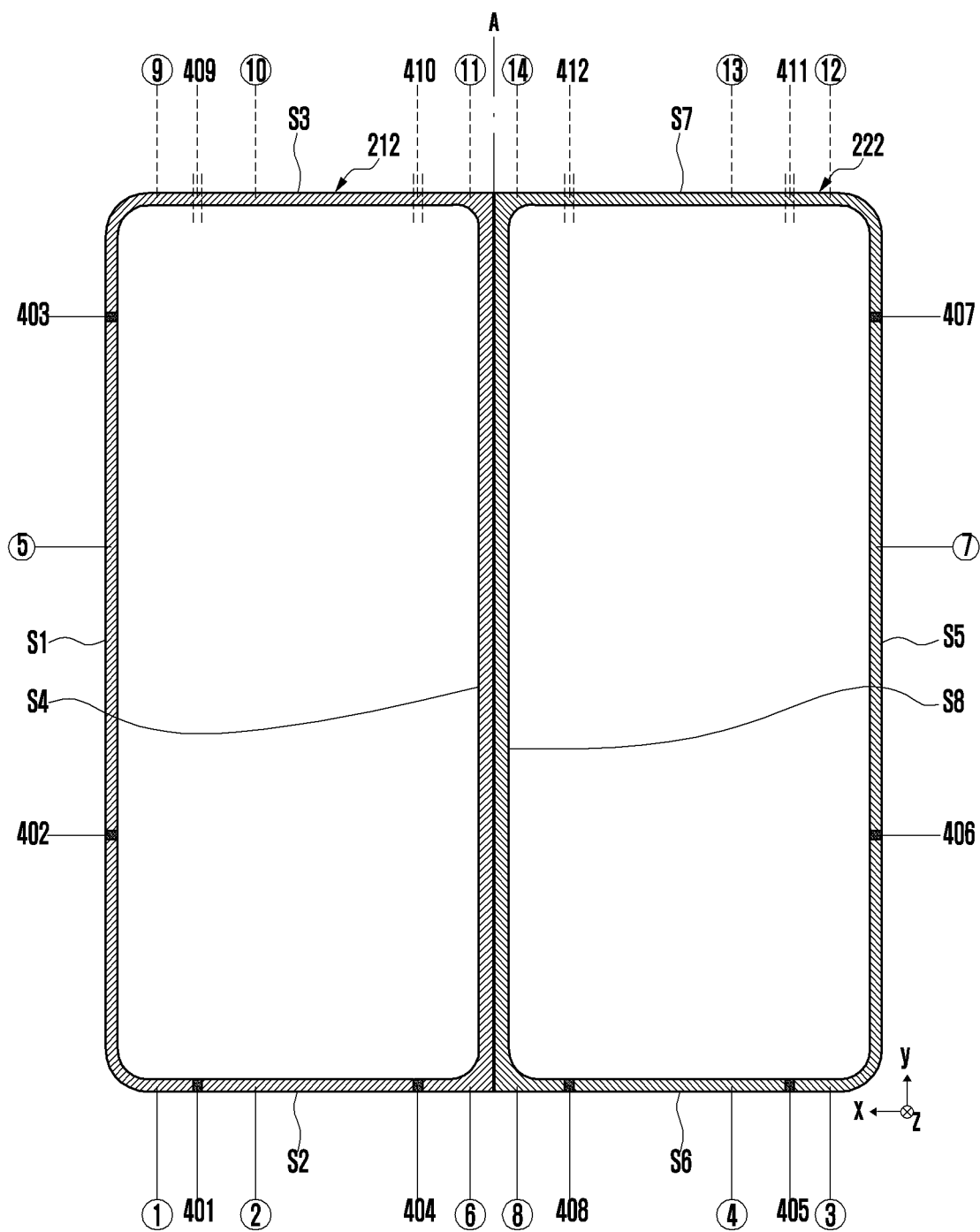
FIG. 4 is a view illustrating a first side member and a second side member in an embodiment.

FIG. 4 is a view illustrating a first side member 212 and a second side member 222 in an embodiment. The electronic device can use portions of the first side member 212 and the second side member 222 as antennas. The first side member includes side parts S1 . . . S4, while the second side member includes side parts S5 . . . S8. The side members 212 and 222 include insulating parts 401 . . . 411 that divide the first side member 212 and the second side member 222 into conductive parts ①. . . ⑭.

Referring to FIG. 4, the first side member 212 may provide the first side surface 20C (see FIG. 2) of the electronic device 2. The second side member 222 may provide the second side surface 20D (see FIG. 2) of the electronic device 2. In an embodiment, the first side member 212 may include a first side part S1, a second side part S2, a third side part S3, and/or a fourth side part S4. The first side part S1 may be spaced apart from the folding axis A and may be substantially parallel thereto. The fourth side part S4 may be parallel to the folding axis A and may be positioned closer to the folding axis A than the first side part S1. The second side part S2 may connect one end of the first side part S1 and one end of the fourth side part S4, and may be substantially perpendicular to the folding axis A. The third side part S3 may connect the opposite end of the first side part S1 and the opposite end of the fourth side part S4, and may be spaced apart from the third side part S3 so as to be substantially parallel thereto. In an embodiment, the corner where the first side part S1 and the second side part S2 of the first side member 212 are connected, or the corner where the first side part S1 and the third side part S3 of the first side member 212 are connected may be provided in a round shape or a curved shape.

The second side member 222 may include a fifth side part S5, a sixth side part S6, a seventh side part S7, and/or an eighth side part S8. The fifth side part S5 may be spaced apart from the folding axis A and may be substantially parallel thereto. The eighth side part S8 may be parallel to the folding axis A and may be positioned closer to the folding axis A than the fifth side part S5. The sixth side part S6 may connect one end of the fifth side part S5 and one end of the eighth side part S8, and may be substantially perpendicular to the folding axis A. The seventh side part S7 may connect the opposite end of the fifth side part S5 and the opposite end of the eighth side part S8, and may be spaced apart from the seventh side part S7 so as to be substantially parallel thereto. In an embodiment, the corner where the fifth side part S5 and the sixth side part S6 of the second side member 222 are connected, or the corner where the fifth side part S5 and the seventh side part S7 of the second side member 222 are connected may be provided in a round shape or a curved shape. The first side part S1 and the fifth side part S5, the second side part S2 and the sixth side part S6, the third side part S3 and the seventh side part S7, and the fourth side part S4 and the eighth side part S8 may be aligned to overlap each other in the folded state of the electronic device 2 (see FIG. 3).

The first side member 212 may include a first conductive part ①, a second conductive part ②, a fifth conductive part ⑤, a sixth conductive part ⑥, and a first insulating part 401, a second insulating part 402, a third insulating part 403, and/or a fourth insulating part 404. The first conductive part ① may include a curved corner where the first side part S1 and the second side part S2 are connected and provide a portion of the first side part S1 and a portion of the second side part S2. The second conductive part ② may provide a portion of the second side part S2. The fifth conductive part ⑤ may provide a portion of the first side part S1. The sixth conductive part ⑥ may include a corner where the first side part S1 and the third side part S3 are connected, a corner where the third side part S3 and the fourth side part S4 are connected, and a corner where the fourth side part S4 and the second side part S2 are connected, and provide a portion of the first side part S1, the third side part S3, the fourth side part S4, and a portion of the second side part S2. The first conductive part ① may extend from one end corresponding to the second conductive part ② to the opposite end corresponding to the fifth conductive part ⑤. The fifth conductive part ⑤ may extend from one end corresponding to the first conductive part ① to the opposite end corresponding to the sixth conductive part ⑥. The sixth conductive part ⑥ may extend from one end corresponding to the fifth conductive part ⑤ to the opposite end corresponding to the second conductive part ②. The second conductive part ② may extend from one end corresponding to the sixth conductive part ⑥ to the opposite end corresponding to the first conductive part ①. The first insulating part 401 may be positioned between the first conductive part ① and the second conductive part ②, and provide a portion of the second side part S2. The second insulating part 402 may be positioned between the first conductive part ① and the fifth conductive part ⑤ and provide a portion of the first side part S1. The third insulating part 403 may be positioned between the fifth conductive part ⑤ and the sixth conductive part ⑥ and provide a portion of the first side part S1. The fourth insulating part 404 may be positioned between the second conductive part ② and the sixth conductive part ⑥ and provide a portion of the second side part S2. In an embodiment, the electronic device 2 (see FIG. 2) may include a first support member (or a first bracket, a first mounting plate, or a first support structure) (not shown) positioned between the front cover 201 and the first rear cover 211, and the first support member may be connected to the first side member 212 or may be at least partially integral with the first side member 212. The first support member is a portion in which elements such as a portion of the flexible display 30, a first printed circuit board, or a first battery, which are positioned in the first housing 21 (see FIG. 2), are disposed, and may contribute to durability or stiffness (e.g., torsional stiffness) of the electronic device 2. The first support member may include a metal material and/or a non-metal material (e.g., polymer). For example, the first support member may include a first conductive area including a metal material, and a first non-conductive area coupled to the first conductive area and including a non-metal material. The first conductive part ①, the second conductive part ②, the fifth conductive part ⑤, or the sixth conductive part ⑥ may be integrally formed with the first conductive area or may be connected to the first conductive area. The first insulating part 401, the second insulating part 402, the third insulating part 403, or the fourth insulating part 404 may be integrally formed with the first non-conductive area or may be connected to the first non-conductive area. In an embodiment, the first support member may be interpreted as a portion of the first housing 21.

The second side member 222 may include a third conductive part ③, a fourth conductive part ④, a seventh conductive part ⑦, an eighth conductive part ⑧, and a fifth insulating part 405, a sixth insulating part 406, a seventh insulating part 407, and/or an eighth insulating part 408. The third conductive part ③ may include a curved corner where the fifth side part S5 and the sixth side part S6 are connected and provide a portion of the fifth side part S5 and a portion of the sixth side part S6. The fourth conductive part ④ may provide a portion of the sixth side part S6. The seventh conductive part ⑦ may provide a portion of the fifth side part S5. The eighth conductive part ⑧ may include a corner where the fifth side part S5 and the seventh side part S7 are connected, a corner where the seventh side part S7 and the eighth side part S8 are connected, and a corner where the eighth side part S8 and the sixth side part S6 are connected, and provide a portion of the fifth side part S5, the seventh side part S7, the eighth side part S8, and a portion of the sixth side part S6. The fifth insulating part 405 may be positioned between the third conductive part ③ and the fourth conductive part ④ and provide a portion of the sixth side part S6. The sixth insulating part 406 may be positioned between the third conductive part ③ and the seventh conductive part ⑦ and provide a portion of the fifth side part S5. The seventh insulating part 407 may be positioned between the seventh conductive part ⑦ and the eighth conductive part ⑧ and provide a portion of the fifth side part S5. The eighth insulating part 408 may be positioned between the fourth conductive part ④ and the eighth conductive part ⑧ and provide a portion of the sixth side part S6. In an embodiment, the electronic device 2 (see FIG. 2) may include a second support member (or a second bracket, a second mounting plate, or a second support structure) (not shown) positioned between the front cover 201 and the second rear cover 221, and the second support member may be connected to the second side member 222 or may be, at least in part, formed integrally with the second side member 222. The second support member is a portion in which is a portion in which elements such as a portion of the flexible display 30, a second printed circuit board, or a second battery, which are positioned in the second housing 22 (see FIG. 2), are disposed, and may contribute to durability or stiffness (e.g., torsional stiffness) of the electronic device 2. The second support member may include a metal material and/or a non-metal material (e.g., polymer). For example, the second support member may include a second conductive area including a metal material, and a second non-conductive area coupled to the second conductive area and including a non-metal material. The third conductive part ③, the fourth conductive part ④, the seventh conductive part ⑦, or the eighth conductive part ⑧ may be integrally formed with the second conductive area or may be connected to the second conductive area. The fifth insulating part 405, the sixth insulating part 406, the seventh insulating part 407, or the eighth insulating part 408 may be integrally formed with the second non-conductive area or may be connected to the second non-conductive area. In an embodiment, the second support member may be interpreted as a portion of the second housing 22.

In the folded state of the electronic device 2 (see FIG. 3), the first insulating part 401 and the fifth insulating part 405, the second insulating part 402 and the sixth insulating part 406, the third insulating part 403 and the seventh insulating part 407, and the fourth insulating part 404 and the eighth insulating part 408 may be aligned with each other. In the folded state of the electronic device 2, the first conductive part ① and the third conductive part ③, the second conductive part ② and the fourth conductive part ④, the fifth conductive part ⑤ and the seventh conductive part ⑦, and the sixth conductive part ⑥ and the eighth conductive part ⑧ may be aligned to overlap each other. The shapes or number of conductive parts or insulating parts included in the first side member 212 may vary without being limited to the illustrated example, and the second side member 222 may be configured to have a plurality of conductive parts and/or insulating parts aligned with a plurality of conductive parts and a plurality of insulating parts of the first side member 212 in the folded state of the electronic device 2. In an embodiment, the first side member 212 may be modified to include a ninth conductive part ⑨, a tenth conductive part ⑩, an eleventh conductive part ⑪, a ninth insulating part 409, and a tenth insulating part 410, replacing the sixth conductive part ⑥. The ninth conductive part ⑨ may include a curved corner where the first side part S1 and the third side part S3 are connected, and provide a portion of the first side part S1 and a portion of the third side part S3. The tenth conductive part ⑩ may provide a portion of the third side part S3. The eleventh conductive part ⑪ may include a corner where the second side part S2 and the fourth side part S4 are connected, and a corner where the third side part S3 and the fourth side part S4 are connected, and provide a portion of the second side part S2, a portion of the third side part S3, and the fourth side part S4. The ninth insulating part 409 may be positioned between the ninth conductive part ⑨ and the tenth conductive part ⑩. The tenth insulating part 410 may be positioned between the tenth conductive part ⑩ and the eleventh conductive part ⑪. In response to the modification of the first side member 212, the second side member 222 may be modified to include a twelfth conductive part ⑫, a thirteenth conductive part ⑬, a fourteenth conductive part ⑭, an eleventh insulating part 411, and a twelfth insulating part 412, replacing the eighth conductive part ⑧. In an embodiment, the first insulating part 401 and the ninth insulating part 409, the fourth insulating part 404 and the tenth insulating part 410, the fifth insulating part 405 and the eleventh insulating part 411, or the eighth insulating part 408 and the twelfth insulating part 412 may be aligned in the direction of the folding axis A.

The electronic device 2 may transmit/receive a signal (e.g., a frequency signal) in a selected or specified frequency band using the first conductive part ①, the second conductive part ②, the fifth conductive part ⑤, or the sixth conductive part ⑥ (or the ninth conductive part ⑨, the tenth conductive part ⑩, or the eleventh conductive part ⑪) included in the first side member 212. The electronic device 2 may transmit/receive a signal in a selected or specified frequency band using the third conductive part ③, the fourth conductive part ④, the seventh conductive part ⑦, or the eighth conductive part ⑧ (or the twelfth conductive part ⑫, the thirteenth conductive part ⑬, or the fourteenth conductive part ⑭) included in the second side member 222. For example, at least one conductive part included in the first side member 212 or at least one conductive part included in the second side member 222 may be electrically connected to a wireless communication circuit (e.g., the wireless communication module 192 in FIG. 1) included in the electronic device 2 to operate as an antenna radiator. The wireless communication circuit may process a transmission signal or a reception signal in at least one selected or specified frequency band through at least one radiator. The selected or specified frequency band may include at least one of, for example, a low band (LB) (about 600 MHz to about 1 GHz), a middle band (MB) (about 1 GHz to about 2.3 GHz), a high band (HB) (about 2.3 GHz to about 2.7 GHz), or an ultra-high band (UHB) (about 2.7 GHz to about 6 GHz). The specified frequency band may include various other frequency bands. Although not shown, the electronic device 2 may include various one or more other antenna radiators. The structure in which a plurality of insulating parts (e.g., the first insulating part 401, the second insulating part 402, the third insulating part 403, and the fourth insulating part 404) of the first side member 212 and a plurality of insulating parts (e.g., the fifth insulating part 405, the sixth insulating part 406, the seventh insulating part 407, and the eighth insulating part 408) of the second side member 222 are aligned to correspond to each other in the folded state of the electronic device 2 (see FIG. 3) may reduce deterioration of the antenna radiation performance when at least one conductive part included in the first side member 212 or at least one conductive part included in the second side member 222 is used as an antenna radiator.

A wireless communication circuit (e.g., the wireless communication module 192 in FIG. 1) or a processor (e.g., the processor 120 in FIG. 1) included in the electronic device 2 may transmit or receive data through a MIMO technique using a plurality of antenna radiators in a communication mode using a corresponding frequency band. The electronic device 2 may include a memory (e.g., the memory 130 in FIG. 1) electrically connected to the processor. The memory may store instructions that cause the processor to transmit or receive data through a MIMO technique by selectively using a plurality of antenna radiators, based on a communication mode. For example, the MIMO technique may include a "beamforming" method of adjusting the signal strength depending on the position angle of a base station (or a transmitter) and a user by adjusting phase information of each antenna radiator, thereby eliminating surrounding interference and improving performance. For example, the MIMO technique may include a "diversity" method of increasing the distance between antenna radiators to make independent signals between the antenna radiators, thereby improving performance. For example, the MIMO technique may include a "multiplexing" method of producing a virtual auxiliary channel between transmission and reception antenna radiators and transmitting different data through the respective transmission antennas, thereby increasing the transmission rate. In an embodiment, a technique in which a base station transmits different data through the respective transmission antennas and in which the electronic device 2 separates the transmission data by appropriate signal processing may be utilized. For example, a 4×4-MIMO technique may utilize four antenna radiators for each of the base station (or a transmitter) and the electronic device 2 (or a receiver).

When the electronic device 2 is held in the user's hand, the user's hand may make contact with at least a portion of the conductive parts ①, ②, ③, ④, ⑤, ⑥, ⑦, ⑧, ⑨, ⑩, ⑪, ⑫, ⑬, and ⑭. The human body generally has dielectric properties. The contact between the user's hand and a conductive part ①, ②, ③, ④, ⑤, ⑥, ⑦, ⑧, ⑨, ⑩, ⑪, ⑫, ⑬, or ⑭ may degrade radio waves.

Certain embodiments may reduce the degradation of radio waves by detecting the location of user's hand using grip sensors. Based on the detected location of the user's hand, a switches selectively connects or separate different conductive members from each other.

Figure 5:
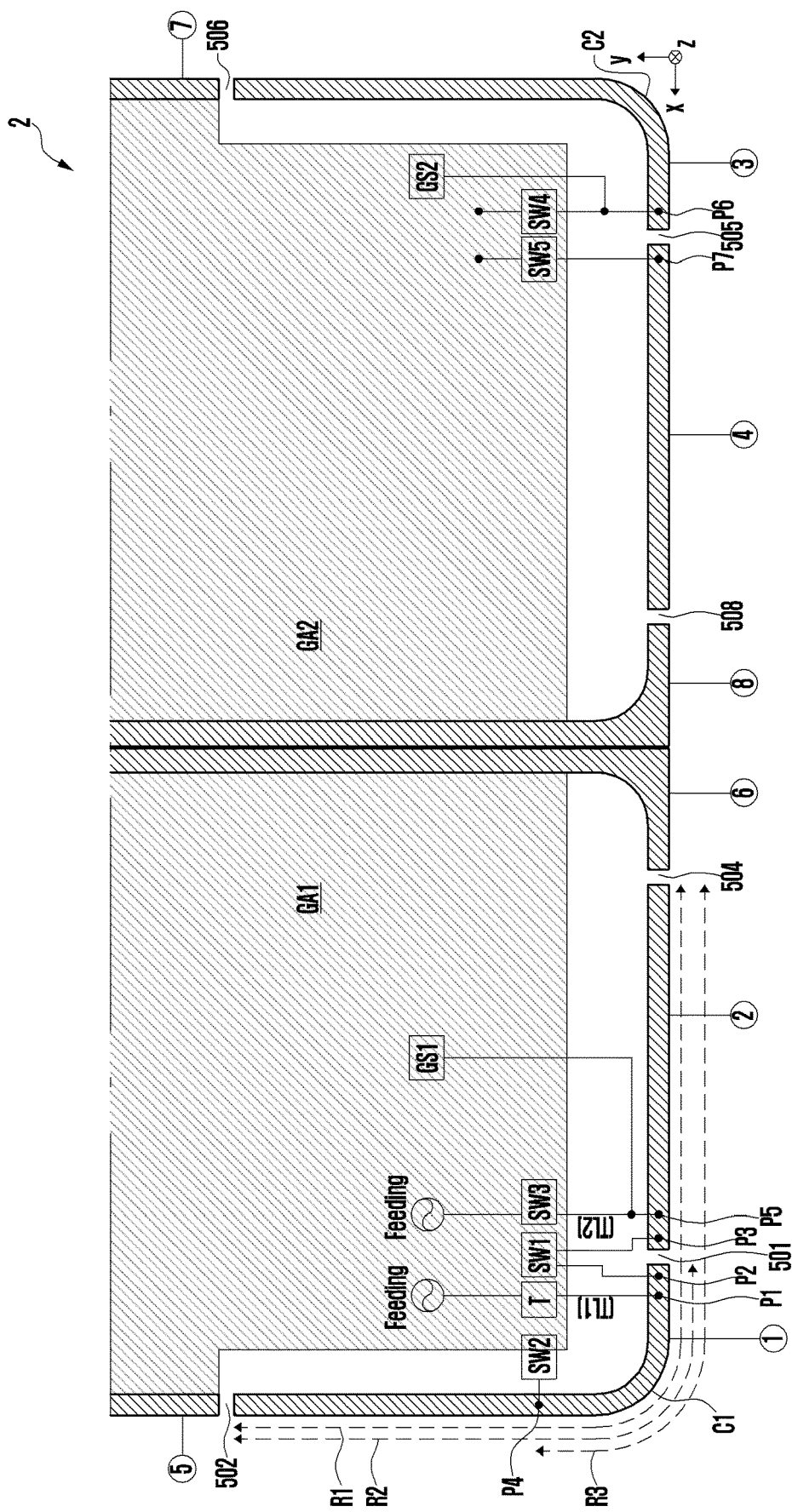
FIG. 5 is a block diagram of an electronic device according to an embodiment.
Figure 6:
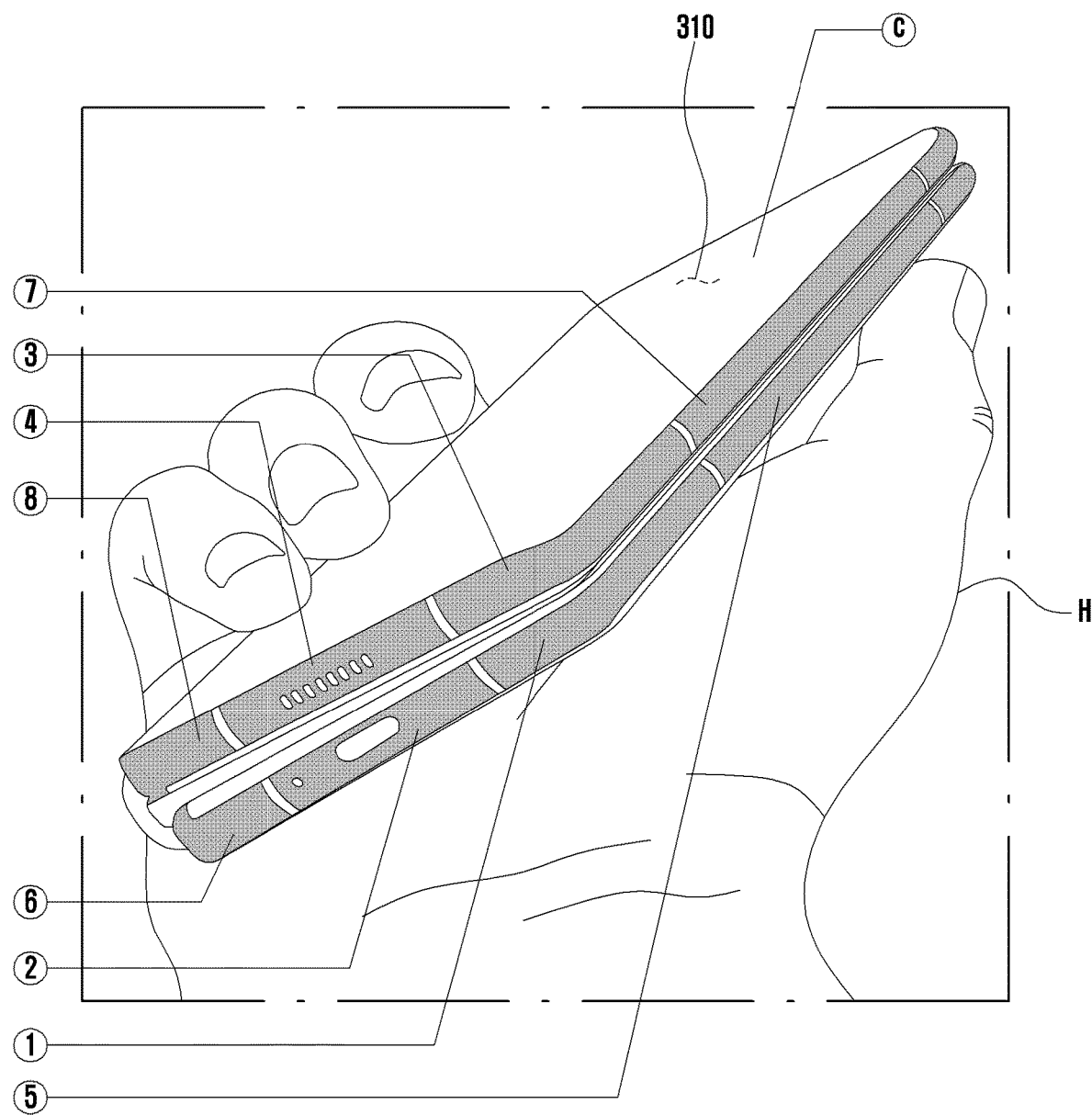
FIG. 6 is a perspective view illustrating a state in which, for example, an electronic device in a folded state is carried by a user's hand.

FIG. 5 is a block diagram of an electronic device 2 according to an embodiment. FIG. 6 is a perspective view illustrating the state in which, for example, an electronic device 2 in a folded state is carried by a user's hand H.

Referring to FIG. 5, in an embodiment, the electronic device 2 may include a first conductive part ①, a second conductive part ②, a third conductive part ③, a fourth conductive part ④, a fifth conductive part ⑤, a sixth conductive part ⑥ (or a ninth conductive part ⑨, a tenth conductive part ⑩, or an eleventh conductive part ⑪), a seventh conductive part ⑦, an eighth conductive part ⑧ (or a twelfth conductive part ⑫, a thirteenth conductive part ⑬, or a fourteenth conductive part ⑭), a first ground area GA1, a second ground area GA2, a tuner T, a first grip sensor GS1, a second grip sensor GS2, a first switching circuit SW1, a second switching circuit SW2, a third switching circuit SW3, a fourth switching circuit SW4, and/or a fifth switching circuit SW5.

The first ground area GA1 may serve as an antenna ground for an antenna radiator (or radiation part) including at least a portion of the first conductive part ①and the second conductive part ②. The first ground area GA1 may include, for example, a ground (e.g., a ground plane) included in a first printed circuit board (not shown) positioned in the inner space of the first housing 21 (see FIG. 2). The first ground area GA1 may be positioned to be physically separated from the first conductive part ①, the second conductive part ②, the fifth conductive part ⑤, and the sixth conductive part ⑥ included in the first side member 212 (see FIG. 4).

The tuner T, the first grip sensor GS1, the first switching circuit SW1, the second switching circuit SW2, or the third switching circuit SW3 may be disposed on the first printed circuit board. The second ground area GA2 may include a ground (e.g., a ground plane) included in a second printed circuit board (not shown) positioned in the inner space of the second housing 21 (see FIG. 2). The first printed circuit board and the second printed circuit board may be electrically connected through an electric path such as a flexible printed circuit board (FPCB). The first ground area GA1 and the second ground area GA2 may be electrically connected. The second ground area GA2 may be positioned to be physically separated from the third conductive part ③, the fourth conductive part ④, the seventh conductive part ⑦, and the eighth conductive part ⑧ included in the second side member 222 (see FIG. 4). The second grip sensor GS2, the fourth switching circuit SW4, or the fifth switching circuit SW5 may be disposed on the second printed circuit board.

The first conductive part ① and the second conductive part ② may each be connected to a switch SW1. SW1 can either electrically connect or separate first conductive part ① and the second conductive part ②. The grip sensor GS1 detects whether the user's body part (hand) makes contact with the second conductive part ②. Based on whether the grip sensor GS1 detects the contact, the switch SW1 can electrically connect or separate the first conductive part ① and the second conductive part ②.

The first conductive part ① may be electrically connected to a first transmission line TL1. The first conductive part ① may receive radio frequency (RF) signals (voltage or current) from a communication circuit (e.g., the wireless communication module 192 in FIG. 1) through the first transmission line TL1. The first transmission line TL1 may be electrically connected to a first point (or first portion) P1 of the first conductive part ①. The first point P1 is a portion in which radiation current is provided to the first conductive part ① through the first transmission line TL1, and may be referred to as a "first feeding point" or a "first feeding portion". For example, the first point P1 may be positioned between a fourth point P4 provided by the first conductive part ① of the first side member 212 (see FIG. 4) and a gap, in which a first disconnection part 501 (e.g., the first insulating part 401 in FIG. 4) is positioned, between the first conductive part ① and the second conductive part ②. The position of the first point P1 may vary without being limited to the illustrated example.

The first switching circuit SW1 may be electrically connected to the first conductive part ① and the second conductive part ②. The first switching circuit SW1 may be electrically connected to a second point (or second portion) P2 of the first conductive part ①using an electric path. The second point P2 may be positioned between, for example, the first point P1 and the first disconnection part 501. The first switching circuit SW1 may be electrically connected to a third point (or third portion) P3 of the second conductive part ②using an electric path. For example, the third point P3 may be positioned closer to the first disconnection part 501 than a fourth disconnection part 504 (e.g., the gap between the second conductive part ② and the sixth conductive part ⑥ in which the fourth insulating part 404 in FIG. 4 is positioned). The position of the second point P2 or the position of the third point P3 may vary without being limited to the illustrated example.

The second switching circuit SW2 may be electrically connected to the first conductive part ①. The second switching circuit SW2 may be electrically connected to a fourth point (or fourth portion) P4 of the first conductive part ①using an electric path. For example, the fourth point P4 may be positioned between a second disconnection part 502 (e.g., the gap between the first conductive part ① and the fifth conductive part ⑤ in which the second insulating part 402 in FIG. 4 is positioned) and the first point P1. The position of the fourth point P4 may vary without being limited to the illustrated example.

The second conductive part ② may be electrically connected to a second transmission line TL2. The second conductive part ② may receive RF signals (voltage or current) from the communication circuit (e.g., the wireless communication module 192 in FIG. 1) through the second transmission line TL2. A fifth point P5 is a portion in which radiation current is provided to the second conductive part ② through the second transmission line TL2, and may be referred to as a "second feeding point" or a "second feeding portion". The second transmission line TL2 may be electrically connected to the fifth point (or fifth portion) P5 of the second conductive part ②. The fifth point P5 may be positioned between, for example, the third point P3 and the fourth disconnection part 504. The third point P3 may be positioned between the first disconnection part 501 and the fifth point P5. The position of the fifth point P5 may vary without being limited to the illustrated example. In an embodiment, the third switching circuit SW3 may be disposed on the second transmission line TL2.

The fourth switching circuit SW4 may be electrically connected to the third conductive part ③ and the second ground area GA2. The fourth switching circuit SW4 may be electrically connected to a sixth point (or sixth part) P6 of the third conductive part ③using an electric path. For example, the sixth point P6 may be positioned between the sixth disconnection part 506 and the fifth disconnection part 505 (e.g., the gap between the third conductive part ③ and the fourth conductive part ④ in which the fifth insulating part 405 in FIG. 4 is positioned) of the second side member 222 (see FIG. 4). The position of the sixth point P6 may vary without being limited to the illustrated example.

The fifth switching circuit SW5 may be electrically connected to the fourth conductive part ④ and the second ground area GA2. The fifth switching circuit SW5 may be electrically connected to a seventh point (or seventh portion) P7 of the fourth conductive part ④using an electric path. For example, the seventh point P7 may be positioned closer to the fifth disconnection part 505 than an eighth disconnection part 508 (e.g., the gap between the fourth conductive part ④ and the eighth conductive part ⑧ in which the eighth insulating part 408 in FIG. 4 is positioned). The position of the seventh point P7 may vary without being limited to the illustrated example.

The first grip sensor GS1 may be electrically connected to the second conductive part ②. For example, the electronic device 2 may include an electric path connecting a portion of the second transmission line TL2 between the fifth point P5 and the third switching circuit SW3 to the first grip sensor GS1. In an embodiment, the first grip sensor GS1 may be electrically connected to the first conductive part ① instead of or in addition to the second conductive part ②. In an embodiment, the first grip sensor GS1 or an added grip sensor may be electrically connected to the first conductive part ①, the fifth conductive part ⑤, or the sixth conductive part ⑥ (or the ninth conductive part ⑨, the tenth conductive part ⑩, or the eleventh conductive part ⑪ in FIG. 4).

The second grip sensor GS2 may be electrically connected to the third conductive part ③. For example, the electronic device 2 may include an electric path connecting the electric path connecting the fourth switching circuit SW4 and the sixth point P6 to the second grip sensor GS2. In an embodiment, the second grip sensor GS2 may be electrically connected to the fourth conductive part ④ instead of or in addition to the third conductive part ③. In an embodiment, the second grip sensor GS2 or an added grip sensor may be electrically connected to the fourth conductive part ④, the seventh conductive part ⑦, or the eighth conductive part (or the twelfth conductive part ⑫, the thirteenth conductive part ⑬, or the fourteenth conductive part ⑭ in FIG. 4).

The tuner T may be disposed on the first transmission line TL1. In an embodiment, the tuner T may be a frequency adjustment circuit for adjusting a resonant frequency. The tuner T may include, for example, one or more switching elements or elements such as tunable capacitors in series and/or parallel for implementing various capacitances. In an embodiment, the tuner T may shift the resonant frequency of the antenna radiator to a specified frequency or shift the resonant frequency of the antenna radiator by a specified value under the control of a processor (e.g., the processor 120 in FIG. 1) or a wireless communication circuit in order to support a corresponding communication mode.

The electronic device 2 may identify a spatial or positional relationship between the electronic device 2 and an external dielectric such as a hand using the first grip sensor GS1 and/or the second grip sensor GS2. For example, the first grip sensor GS1 may measure capacitance using the second conductive part ②, and the second grip sensor GS2 may measure capacitance using the third conductive part ③. The first grip sensor GS1 may be referred to as a "first capacitance sensor", and the second grip sensor GS2 may be referred to as a "second capacitance sensor". For example, the electric field formed in the second conductive part ② may vary depending on a spatial or positional relationship between the electronic device 2 and an external dielectric, and the first grip sensor GS1 may measure capacitance corresponding to a change in the electric field (or voltage drop). For example, the electric field formed in the third conductive part ③ may vary depending on a spatial or positional relationship between the electronic device 2 and an external dielectric, and the second grip sensor GS2 may measure capacitance corresponding to a change in the electric field (or voltage drop). The electronic device 2, based on the capacitance measured by the first grip sensor GS1 and/or the capacitance measured by the second grip sensor G2, may identify any one of a plurality of usage conditions corresponding to the spatial or positional relationship between the electronic device 2 and the external dielectric. In an embodiment, the first grip sensor GS1 or an added grip sensor may be electrically connected to at least some of the plurality of conductive parts included in the first side member 212 (first plurality of conductive parts) (see FIG. 4) to measure capacitance. In an embodiment, the second grip sensor GS2 or an added grip sensor may be electrically connected to at least some of the plurality of conductive parts included in the second side member 222 (see FIG. 4) to measure capacitance. The electronic device 2, based on the capacitance measured by the first grip sensor GS1 or the additional grip sensor using one or more conductive parts included in the first side member 212 and/or the capacitance measured by the second grip sensor G2 or the additional grip sensor using one or more conductive parts included in the second side member 222, may identify any one of a plurality of usage conditions corresponding to a spatial or positional relationship between the electronic device 2 and the external dielectric.

If the capacitance measured through the second conductive part ② is less than or equal to a threshold, the first grip sensor GS1 may output a first signal (e.g., a grip signal) corresponding thereto. If the capacitance measured through the third conductive part ③ is less than or equal to a threshold, the second grip sensor GS2 may output a second signal (e.g., a second grip signal) corresponding thereto. The electronic device 2 may identify a usage condition, based on the presence or absence of the first signal and/or the presence or absence of the second signal. For example, in a first example in which the electronic device 2 in the folded state is not carried by the user's hand, the first grip sensor GS2 may not generate a first signal, and the second grip sensor GS2 may not generate a second signal. Corresponding to the first example, the electronic device 2 may identify or recognize that the electronic device 2 is in a first usage condition in which it is not carried by the user's hand. As another example, referring to FIG. 6, the electronic device 2 in the folded state may be carried by the user's hand H1 such that the fourth cover area ⓓ thereof (see FIG. 3) faces the palm and such that the third cover area ⓒ is visible. In a second example shown in FIG. 6, the hand H may be closer to the second conductive part ② than to the third conductive part ③, thereby more substantially affecting the second conductive part ② than the third conductive part ③. In the second example, the first grip sensor GS1 may generate a first signal, and the second grip sensor GS2 may not generate a second signal. Corresponding to the second example, the electronic device 2 may identify or recognize that the electronic device 2 is in a second usage condition in which it is carried by the user's hand. As another example, although not shown, in a third example in which the electronic device 2 in the folded state is carried by the user's hand, the first grip sensor GS1 may generate a first signal, and the second grip sensor GS2 may generate a second signal. Corresponding to the third example, the electronic device 2 may identify or recognize that the electronic device 2 is in a third usage condition it is carried by the user's hand. In an embodiment, the implementation in which the first grip sensor GS1 uses the second conductive part ② and in which the second grip sensor GS2 uses the third conductive part ③ may make it possible to more accurately identify the usage conditions of the electronic device 2 in the folded state by considering that the user is likely to carry the electronic device 2 in the folded state by the hand such that the sub-display 310 is visible. The positions or number of conductive parts used by the first grip sensor GS1 or the second grip sensor GS2 is not limited to the illustrated example and may vary. The number of grip sensors is not limited to the illustrated example and may vary. In an embodiment, the conductive part used by the first grip sensor GS1 is not limited to the first side member 212 (see FIG. 2), and a conductive part or a conductive pattern positioned or accommodated in the first housing 21 (FIG. 2) may be used. In an embodiment, the conductive part used by the second grip sensor GS2 is not limited to the second side member 222 (see FIG. 2), and a conductive part or a conductive pattern positioned or accommodated in the second housing 22 (FIG. 2) may be used. The first usage condition relates to the first example in which the electronic device 2 in the folded state is not carried by hand, but it may be understood as a state in which the external dielectric does not substantially affect the radio wave transmission/reception performance of the electronic device 2. The second usage condition or the third usage condition relates to an example of carrying the electronic device 2 in the folded state by hand, but it may be understood as a state in which the external dielectric affects the radio wave transmission/reception performance of the electronic device 2 and, not limited to the carrying state using hands, may occur in various other usage environments corresponding to the external dielectric. The third usage condition may be understood as a state in which the first conductive part ① is more affected by the external dielectric compared to the second usage condition and, not limited to the carrying state using hands, may occur in various other usage environments corresponding to the external dielectric. Hereinafter, in order to easily explain the technical concept according to the embodiments of this document and help understanding of the embodiments of this document, the first usage condition will be referred to as a "free state", the second usage condition will be referred to as a "first grip state", and the third usage condition will be referred to as a "second grip state".

The electronic device 2, based on a spatial or positional relationship between the electronic device 2 and the external dielectric, may variably implement an antenna radiator (or radiation part) in order to increase the possibility of securing radio wave transmission/reception performance in a working frequency band (e.g., the frequency band in which a communication circuit such as the wireless communication module 192 in FIG. 1 transmits and/or receives signals). For example, the antenna radiator may be variably implemented depending on usage conditions of the electronic device 2 (e.g., a free state, a first grip state, or a second grip state). The method of variably implementing the antenna radiator depending on the usage conditions of the electronic device 2 may reduce the degradation of radio wave transmission and reception due to the external dielectric and reduce a difference of performance in various usage conditions (or usage environments). In an embodiment, the electronic device 2 may identify a usage condition of the electronic device 2 using the first grip sensor GS1 and the second grip sensor GS2, and control the first switching circuit SW1, the second switching circuit SW2, and/or the third switching circuit SW3 according to the identified usage condition. If the electronic device 2 controls the first switching circuit SW1, the second switching circuit SW2, and/or the third switching circuit SW3 according to the usage condition, a portion of the first conductive part ① and second conductive part ②, which actually operates as an antenna radiator (or radiation part), may be determined.

Table 1 below shows the operation of the electronic device 2 in the folded state for the first switching circuit SW1, the second switching circuit SW2, and the third switching circuit SW3 depending on the usage condition.

TABLE 1

| Usage condition | First grip sensor GS1 | Second grip sensor GS2 | First switching circuit SW1 | Second switching circuit SW2 | Third switching circuit SW3 |
| --- | --- | --- | --- | --- | --- |
| Free state in standalone (SA) communication mode | — | — | First state | Second state | Second state |
| Free state in carrier aggregation (CA) communication mode | — | — | Third state | Second state | First state |
| First grip state | — | O | First state | Second state | Second state |
| Second grip state | O | O | First state | Third state | Second state |

Referring to Table 1, in the case where the first grip sensor GS1 does not generate a first signal and where the second grip sensor GS2 does not generate a second signal, the usage condition of the electronic device 2 may be identified as a free state. In the case where the first grip sensor GS1 does not generate a first signal and where the second grip sensor GS2 generates a second signal, the usage condition of the electronic device 2 may be identified as a first grip state. In the case where the first grip sensor GS1 generates a first signal and where the second grip sensor GS2 generates a second signal, the usage condition of the electronic device 2 may be identified as a second grip state.

The switching circuit (e.g., the first switching circuit SW1, the second switching circuit SW2, or the third switching circuit SW3) may include, for example, a plurality of RF ports. When the switching circuit is controlled by a processor (e.g., the processor 120 in FIG. 1), it may include switching to electrically connect or electrically disconnect any one of the plurality of ports, which is connected to a first electrical element, to or from another of the plurality of ports, which is connected to a second electrical element. Switching of the switching circuit may include switching to electrically connect or electrically disconnect any one of the plurality of RF ports, which is connected to at least one electrical element, to or from at least one circuit (e.g., a matching circuit or a frequency adjusting circuit). Switching of the switching circuit may include switching to electrically connect or electrically disconnect any one of the plurality of RF ports, which is connected to any one conductive part (e.g., one of the plurality of conductive parts included in the first side member 212 (first plurality of conductive parts) in FIG. 4), to or from another of the plurality of RF ports, which is connected to another conductive part (e.g., another of the plurality of conductive parts included in the first side member 212 (first plurality of conductive parts) in FIG. 4, a conductive part included in a first printed circuit board positioned in the inner space of the first housing 21 in FIG. 2, or a ground), among the plurality of RF ports. Switching of the switching circuit may be implemented in various other ways.

Switching of the switching circuit (e.g., the first switching circuit SW1, the second switching circuit SW2, or the third switching circuit SW3) may include a first state, a second state, a third state, or a fourth state. The first state of the switching circuit may include, for example, switching to electrically connect two RF ports among the RF ports included in the switching circuit. The second state of the switching circuit may include, for example, switching to electrically connect one of the plurality of RF ports to the first ground area GA1 through a lumped element such as a capacitor or an inductor, a passive element, or a frequency-related element. The third state of the switching circuit may include, for example, switching to electrically connect one of the plurality of RF ports to the first ground area GA1. Unlike the second state of the switching circuit, the third state of the switching circuit may indicate switching to electrically connect any one of the plurality of RF ports to the first ground area GA1 without passing through a lumped element such as a capacitor or an inductor, a passive element, or a frequency-related element (e.g., short-circuit). The fourth state of the switching circuit may indicate, for example, switching such that none of the plurality of RF ports are electrically connected to anything (e.g., electrical disconnection).

The switching of the switching circuit may be implemented in various other ways. For example, due to the first state of the first switching circuit SW1, the first conductive part ① and the second conductive part ② may be electrically connected. For example, due to the third state of the first switching circuit SW1, the first conductive part ① may be electrically connected to the first ground area GA1. For example, due to the second state of the second switching circuit SW2, the first conductive part ① may be electrically connected to the first ground area GA1 through a matching circuit. For example, due to the third state of the second switching circuit SW2, the first conductive part ① may be electrically connected to the first ground area GA (e.g., short-circuit). For example, due to the first state of the third switching circuit SW3, the second conductive part ② may be electrically connected to a communication circuit (e.g., the first wireless communication module 192). For example, due to the second state of the third switching circuit SW3, the communication circuit may be electrically connected to the first ground area GA1 through a matching circuit. For example, due to the third state of the third switching circuit SW3, the communication circuit may be electrically connected to the first ground area GA1 (e.g., short circuit). In some embodiments, based on various environments such as a working frequency band (or an operation frequency band), and/or usage conditions of the electronic device 2 in the folded state, the first switching circuit SW1, the second switching circuit SW2, or the third switching circuit SW3 may operate in various other states. For example, in the illustrated Table 1, the third switching circuit SW3 may operate in a fourth state.

When a free state is identified while the electronic device 2 operates in a stand-alone (SA) communication mode, a first antenna may be implemented by switching of the first switching circuit SW1, switching of the second switching circuit SW2, and/or switching of the third switching circuit SW3. The first antenna may transmit and/or receive a signal in a selected or specified frequency band (e.g., LB (e.g., about 600 MHz to about 1 GHz) using a first radiation part (or a first antenna radiator) R1 including the first conductive part ① and the second conductive part ②. When a free state is identified while the electronic device 2 operates in a carrier aggregation (CA) communication mode, a second antenna may be implemented by switching of the first switching circuit SW1, switching of the second switching circuit SW2, and switching of the third switching circuit SW3. The second antenna may transmit and/or receive a signal in a selected or specified frequency band (e.g., LB) using a second radiation part (or a second antenna radiator) R2 including the first conductive part ①. When a second grip state of the electronic device 2 is identified, a third antenna may be implemented by switching of the first switching circuit SW1, switching of the second switching circuit SW2, and switching of the third switching circuit SW3. The third antenna may transmit and/or receive a signal in a selected or specified frequency band (e.g., LB) using a third radiation part (or a third antenna radiator) R3 including a portion of the first conductive part ① and the second conductive part ②. In an embodiment, there is a higher probability of securing antenna radiation performance in the first grip state than in the second grip state, and the first antenna may be substantially implemented in the first grip state. In an embodiment, in the first grip state, another antenna using another radiation part may be implemented by switching of the first switching circuit SW1, switching of the second switching circuit SW2, and switching of the third switching circuit SW3. The electronic device 2 may variably implement the antenna radiator (or radiation part) to increase the possibility of securing radio wave transmission/reception performance in the working frequency band depending on the usage condition identified based on the spatial or positional relationship between the electronic device 2 and the external dielectric, thereby reducing the performance differences in various usage conditions (or usage environments).

Table 1 is merely presented to easily describe the operations of the first switching circuit SW1, the second switching circuit SW2, and/or the third switching circuit SW3 depending on the usage conditions of the electronic device 2 in the folded state and to help understanding of the embodiments, and the disclosure is not limited to the illustrated examples, and the usage conditions of the electronic device 2, the switching circuits controlled in response to the usage conditions, or the switching of the switching circuits may be configured in various ways in order to increase the possibility of securing the radio wave transmission/reception performance in the working frequency band or in order to optimize the radiation condition.

Substantially like the configuration of identifying the usage conditions of the electronic device 2 using the first grip sensor GS1 and the second grip sensor GS2, the electronic device 2 may identify the usage conditions of the electronic device 2 using one or more grip sensors electrically connected to at least one of a plurality of conductive parts included in the first side member 212 (first plurality of conductive parts) (see FIG. 4) and one or more grip sensors electrically connected to at least one of a plurality of conductive parts included in the second side member 222 (second plurality of conductive parts) (see FIG. 4).

Substantially like the configuration of determining a part that substantially operates as an antenna radiator (or radiation part) among the first conductive part ① and the second conductive part ② by controlling the first switching circuits SW1, the second switching circuit SW2, and/or the third switching circuit SW3, the electronic device 2 may be implemented to determine a part that substantially operates as a radiation part among a plurality of conductive parts included in the first side member 212 (first plurality of conductive parts) (see FIG. 4) and a plurality of conductive parts included in the second side member 222 (second plurality of conductive parts) (see FIG. 4) by controlling a plurality of switching circuits. For example, substantially like the configuration of determining a part that substantially operates as an antenna radiator (or radiation part) among the first conductive part ① and the second conductive part ② by controlling the first switching circuits SW1, the second switching circuit SW2, and/or the third switching circuit SW3, the electronic device 2 may be implemented to determine a part that substantially operates as a radiation part among the ninth conductive part ⑨ and the tenth conductive part ⑩ in FIG. 4 by controlling a plurality of switches corresponding to the ninth conductive part ⑨ and the tenth conductive part ⑩.

When an antenna is implemented by controlling one or more switching circuits (e.g., the first switching circuit SW1, the second switching circuit SW2, and/or the third switching circuit SW3) positioned in the inner space of the first housing 21 (see FIG. 2), based on various environments such as a working frequency band and/or usage conditions of the electronic device 2 in the folded state, the electronic device 2 may control the fourth switching circuit SW4. The electronic device 2 may control the fourth switching circuit SW4 to optimize radiation conditions (or to increase the possibility of securing radio wave transmission/reception performance), based on various environments such as a working frequency band and/or usage conditions of the electronic device 2 in a folded state. For example, when an antenna is implemented by controlling one or more switching circuits (e.g., the first switching circuit SW1, the second switching circuit SW2, and/or the third switching circuit SW3) positioned in the inner space of the first housing 21, based on various environments such as a working frequency band and/or usage conditions of the electronic device 2 in the folded state, the fourth switching circuit SW4 may be controlled such that the third conductive part ③ and the second ground area GA2 are electrically connected. In another embodiment, when an antenna is implemented by controlling one or more switching circuits (e.g., the first switching circuit SW1, the second switching circuit SW2, and/or the third switching circuit SW3) positioned in the inner space of the first housing 21, based on various environments such as a working frequency band and/or usage conditions of the electronic device 2 in the folded state, the fourth switching circuit SW4 may be controlled such that the third conductive part ③ and the second ground area GA2 are not electrically connected. In an embodiment, based on various environments such as a working frequency band, and/or usage conditions, switching of the fourth switching circuit SW4 may be configured in various other ways to optimize the radiation conditions (or to increase the possibility of securing radio wave transmission/reception performance). For example, the switching of the fourth switching circuit SW4 may be configured to reduce the effect of the third conductive part ③ on the antenna radiation performance of a radiation part (or antenna radiator) including at least a portion of the first conductive part ①.

When an antenna is implemented by controlling one or more switching circuits (e.g., the first switching circuit SW1, the second switching circuit SW2, and/or the third switching circuit SW3) positioned in the inner space of the first housing 21 (see FIG. 2), based on various environments such as a working frequency band and/or usage conditions of the electronic device 2 in the folded state, the electronic device 2 may control the fifth switching circuit SW5. The electronic device 2 may control the fifth switching circuit SW5 to optimize radiation conditions (or to increase the possibility of securing radio wave transmission/reception performance), based on various environments such as a working frequency band and/or usage conditions of the electronic device 2 in the folded state. For example, when an antenna is implemented by controlling one or more switching circuits (e.g., the first switching circuit SW1, the second switching circuit SW2, and/or the third switching circuit SW3) positioned in the inner space of the first housing 21, based on various environments such as a working frequency band and/or usage conditions of the electronic device 2 in the folded state, the fifth switching circuit SW5 may be controlled such that the fourth conductive part ④ and the second ground area GA2 are electrically connected. As another example, when an antenna is implemented by controlling one or more switching circuits (e.g., the first switching circuit SW1, the second switching circuit SW2, and/or the third switching circuit SW3) positioned in the inner space of the first housing 21, based on various environments such as a working frequency band and/or usage conditions of the electronic device 2 in the folded state, the fifth switching circuit SW5 may be controlled such that the fourth conductive part ④ and the second ground area GA2 are not electrically connected. In an embodiment, based on various environments such as a working frequency band and/or usage conditions, switching of the fifth switching circuit SW5 may be configured in various other ways in order to optimize radiation conditions (or to increase the possibility of securing radio wave transmission/reception performance). For example, the switching of the fifth switching SW5 may be configured to reduce the effect of the fourth conductive part ④ on the antenna radiation performance of a radiation part (or antenna radiator) including at least a portion of the second conductive part ②.

Not limited to the fourth switching circuit SW4 or the fifth switching circuit SW5, various other switching circuits may be positioned in the inner space of the second housing 22 (see FIG. 2), which are to be controlled to optimize radiation conditions (to increase the possibility of securing the radio wave transmission/reception performance), based on various environments such as a working frequency band and/or usage conditions.

Figure 7:
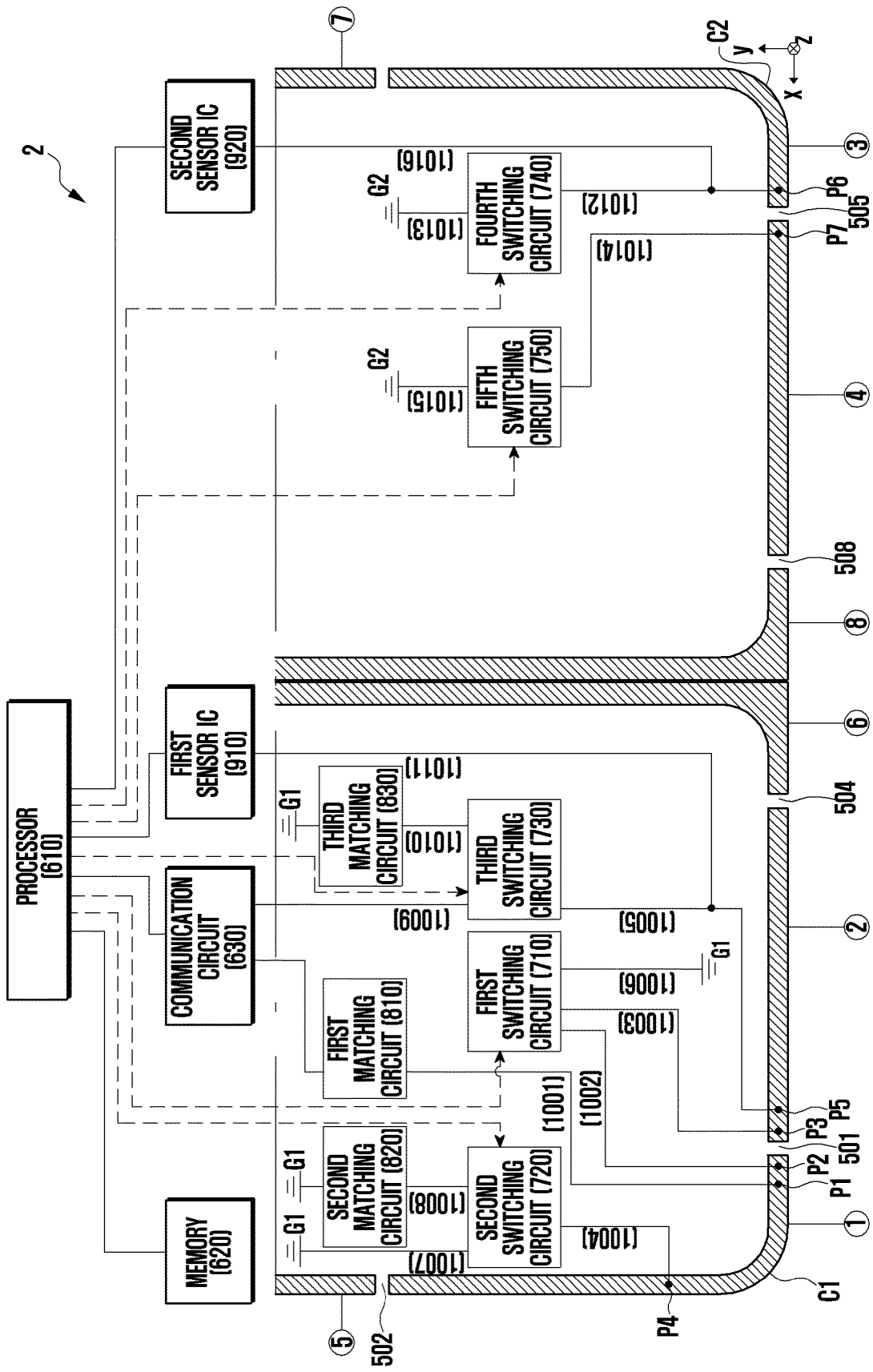
FIG. 7 is a block diagram of an electronic device according to an embodiment.

FIG. 7 is a block diagram of an electronic device 2 according to an embodiment.

Referring to FIG. 7, in an embodiment, the electronic device 2 may include a first conductive part ①, a second conductive part ②, a third conductive part ③, a fourth conductive part ④, a fifth conductive part ⑤, a sixth conductive part ⑥, a seventh conductive part ⑦, an eighth conductive part ⑧, a processor 610 (e.g., the processor 120 in FIG. 1), a memory 620 (e.g., the memory 130 in FIG. 1), a communication circuit 630 (e.g., the wireless communication module 192 in FIG. 1), a first switching circuit 710, a second switching circuit 720, a third switching circuit 730, a fourth switching circuit 740, a fifth switching circuit 750, a first matching circuit 810, a second matching circuit 820, a third matching circuit 830, a first sensor integrated circuit (IC) 910 (e.g., the sensor module 176 in FIG. 1), and a second sensor IC 920 (e.g., the sensor module 176 in FIG. 1), a first ground G1, and/or a second ground G2. The first switching circuit 710 may be, for example, the first switching circuit SW1 in FIG. 5. The second switching circuit 720 may be, for example, the second switching circuit SW2 in FIG. 5. The third switching circuit 730 may be, for example, the third switching circuit SW3 in FIG. 5. The fourth switching circuit 740 may be, for example, the fourth switching circuit SW4 in FIG. 5. The fifth switching circuit 750 may be, for example, the fifth switching circuit SW5 in FIG. 5. The first matching circuit 810 may include, for example, the tuner T in FIG. 5. The first sensor IC 910 may include, for example, the first grip sensor GS1 in FIG. 5. The second sensor IC 920 may include, for example, the second grip sensor GS2 in FIG. 5. The first ground G1 may include, for example, the first ground area GA1 in FIG. 5. The second ground G2 may include, for example, the second ground area GA2 in FIG. 5. The processor 610, the memory 620, the communication circuit 630, the first switching circuit 710, the second switching circuit 720, the third switching circuit 730, the first matching circuit 810, the second matching circuit 820, the third matching circuit 830, or the first sensor IC 910 may be disposed on a first printed circuit board (not shown) positioned in the inner space of the first housing 21 (see FIG. 2). A first electric path 1001, a second electric path 1002, a third electric path 1003, a fourth electric path 1004, a fifth electric path 1005, a sixth electric path 1006, a seventh electric path 1007, an eighth electric path 1008, a ninth electric path 1009, a tenth electric path 1010, or an eleventh electric path 1011 may be, for example, a conductive pattern included in the first printed circuit board. The fourth switching circuit 740, the fifth switching circuit 750, or the second sensor IC 920 may be disposed on a second printed circuit board (not shown) positioned in the inner space of the second housing 22 (see FIG. 2). In an embodiment, the second sensor IC 920 may be disposed on the first printed circuit board positioned in the interior space of the first housing 21. A twelfth electric path 1012, a thirteenth electric path 1013, a fourteenth electric path 1014, a fifteenth electric path 1015, or a sixteenth electric path 1016 may be, for example, a conductive pattern included in the second printed circuit board.

The first conductive part ① may be electrically connected to the communication circuit 630 through the first electric path 1001. The first electric path 1001 may be electrically connected to a first point (or a first portion) P1 of the first conductive part ①. The first matching circuit 810 may be disposed on the first electric path 1001.

The first switching circuit 710 may be electrically connected to a second point (or second portion) P2 of the first conductive part ① through the second electric path 1002. The first switching circuit 710 may be electrically connected to a third point (or third portion) P3 of the second conductive part ② through the third electric path 1003. The first switching circuit 710 may be electrically connected to the first ground G1 through the sixth electric path 1006.

The second switching circuit 720 may be electrically connected to a fourth point (or fourth portion) P4 of the first conductive part ① through the fourth electric path 1004. The second switching circuit 720 may be electrically connected to the first ground G1 through the seventh electric path 1007. The second switching circuit 720 may be electrically connected to the first ground G1 through the eighth electric path 1008. The second matching circuit 820 may be disposed on the eighth electric path 1008. The fourth point P4 is a portion in which the first conductive part ① is electrically connected to the first ground G1 and may be referred to as a "first grounding point" or a "first grounding portion".

The third switching circuit 730 may be electrically connected to a fifth point (or fifth portion) P5 of the second conductive part ② through the fifth electric path 1005. The third switching circuit 730 may be electrically connected to the communication circuit 630 through the ninth electric path 1009. The third switching circuit 730 may be electrically connected to the first ground G1 through the tenth electric path 1010. The third matching circuit 830 may be disposed on the tenth electric path 1010.

The first sensor IC 910 may be electrically connected to the second conductive part ② through the eleventh electric path 1011. The eleventh electric path 1011 may be electrically connected to, for example, the fifth electric path 1005.

The fourth switching circuit 740 may be electrically connected to a sixth point (or sixth portion) P6 of the third conductive part ③ through the twelfth electric path 1012.

The fourth switching circuit 740 may be electrically connected to the second ground G2 through the thirteenth electric path 1013. The fifth switching circuit 750 may be electrically connected to a seventh point (or seventh portion) P7 of the fourth conductive part ④ through the fourteenth electric path 1014. The fifth switching circuit 750 may be electrically connected to the second ground G2 through the fifteenth electric path 1015.

The second sensor IC 920 may be electrically connected to the third conductive part ③ through the sixteenth electric path 1016. The sixteenth electric path 1016 may be electrically connected to, for example, the twelfth electric path 1012.

The first switching circuit 710 may electrically connect the second electric path 1002 to the third electric path 1003 or the sixth electric path 1006 under the control of the processor 610. In the case where the second electric path 1002 is electrically connected to the sixth electric path 1006, the second point P2 is a portion where the first conductive part ① is electrically connected to the first ground G1 and may be referred to as a "second grounding point" or a "second grounding portion". The second switching circuit 720 may electrically connect the fourth electric path 1004 to the seventh electric path 1007 or the eighth electric path 1008 under the control of the processor 610. The third switching circuit 730 may electrically connect the ninth electric path 1009 to the fifth electric path 1005 or the tenth electric path 1010 under the control of the processor 610. According to switching of the first switching circuit 710, switching of the second switching circuit 720, and switching of the third switching circuit 730, the electronic device 2 may include an antenna (or an antenna device or an antenna system) including an antenna radiator (or radiation part) including at least a portion of the first conductive part ① and the second conductive part ②, a first ground G1 electrically connected to the antenna radiator, and a transmission line between the antenna radiator and the communication circuit 630. In an embodiment, the first electric path 1001 may be a first transmission line (e.g., the first transmission line TL1 in FIG. 5). In an embodiment, if the fifth electric path 1005 and the ninth electric path 1009 are electrically connected by the third switching circuit 730, a second transmission line (e.g., the second transmission line TL2 in FIG. 5) including the fifth electric path 1005 and the ninth electric path 1009 may be provided. The communication circuit 630 may provide radiation current to a feeding portion (e.g., the first point P1 and/or the fifth point P5) of the antenna radiator (or radiation part) including at least a portion of the first conductive part ① and the second conductive part ②, and the antenna radiator may form an electromagnetic field capable of transmitting and/or receiving signals in a selected or specified frequency band.

The first matching circuit 810 may perform impedance matching of the antenna radiator including at least a portion of the first conductive part ① and/or the second conductive part ②, and the transmission line (e.g., the first electric path 1001). For example, the first matching circuit 810 may reduce reflection in a selected or specified frequency (or in an operation frequency) with respect to the antenna radiator, and may enable the maximum power transmission (or minimum power loss) through the antenna radiator in a selected or specified frequency or efficient signal transmission. In an embodiment, the first matching circuit 810 may shift the resonant frequency of the antenna radiator to a specified frequency or shift the same by a specified value.

According to an embodiment, when the fourth electric path 1004 and the eighth electric path 1008 are electrically connected by the second switching circuit 720, the second matching circuit 820 may contribute to impedance matching between the antenna radiator including at least a portion of the first conductive part ① and the second conductive part ② and the transmission line. In an embodiment, the second matching circuit 820 may shift the resonant frequency of the antenna radiator to a specified frequency or may shift the same by a specified value.

According to an embodiment, in the case where the second transmission line (e.g., the second transmission line TL2 in FIG. 5) is not provided, the fifth electric path 1005 and the ninth electric path 1009 may be electrically connected by the third switching circuit 730 in order to reduce the effect on the first transmission line (e.g., the first electric path 1001). In an embodiment, when the ninth electric path 1009 and the tenth electric path 1010 are electrically connected by the third switching circuit 730, the third matching circuit 830 may contribute to impedance matching between the antenna radiator including at least a portion of the first conductive part ① and the second conductive part ② and the transmission line. In an embodiment, the third matching circuit 830 may shift the resonant frequency of the antenna radiator to a specified frequency or may shift the same by a specified value.

The first matching circuit 810, the second matching circuit 820, or the third matching circuit 830 may include, for example, at least one lumped element such as an inductor or a capacitor, or a passive element. In an embodiment, the electronic device 2 may further include a matching circuit (not shown) disposed on the fifth electric path 1005 or the ninth electric path 1009.

According to an embodiment, when an antenna is implemented by controlling the first switching circuit 710, the second switching circuit 720, and/or the third switching circuit 730, based on various environments such as a working frequency band and/or usage conditions of the electronic device 2 in the folded state, the processor 610 may control the fourth switching circuit 740. The processor 610 may control the fourth switching circuit 740 to optimize radiation conditions (or to increase the possibility of securing radio wave transmission/reception performance), based on various environments such as a working frequency band and/or usage conditions of the electronic device 2 in the folded state. For example, when an antenna is implemented by controlling the first switching circuit 710, the second switching circuit 720, and/or the third switching circuit 730, based on various environments such as a working frequency band and/or usage conditions of the electronic device 2 in the folded state, the fourth switching circuit 740 may be controlled such that the twelfth electric path 1012 and the thirteenth electric path 1013 are electrically connected. As another example, when an antenna is implemented by controlling the first switching circuit 710, the second switching circuit 720, and/or the third switching circuit 730, based on various environments such as a working frequency band and/or usage conditions of the electronic device 2 in the folded state, the fourth switching circuit 740 may be controlled such that the twelfth electric path 1012 and the thirteenth electric path 1013 are electrically disconnected. In an embodiment, based on various environments such as a working frequency band, and/or usage conditions, switching of the fourth switching circuit 740 may be configured in various other ways to optimize the radiation conditions (or to increase the possibility of securing radio wave transmission/reception performance). In an embodiment, the fourth switching circuit 740 may be controlled to reduce the effect of the third conductive part ③ on the antenna radiation performance of a radiation part (or antenna radiator) including at least a portion of the first conductive part ① or at least a portion of the second conductive part ②. For example, the third conductive part ③ may be electrically connected to the second ground G2 in the folded state of the electronic device 2, thereby reducing the effect of the third conductive part ③ on the antenna radiation performance of an antenna radiator including at least a portion of the first conductive part ①. For example, if the third conductive part ③ is electrically connected to the second ground G2 in the folded state of the electronic device 2, the parasitic resonance frequency formed due to the capacitance (or capacitance component) (e.g., parasitic capacitance) occurring between the first conductive part ① and the third conductive part ③ in the folded state of the electronic device 2 may not be included in the resonance frequency band of the antenna radiator including the first conductive part ①. In an embodiment, the electronic device 2 may further include a lumped element disposed in the twelfth electric path 1012. The lumped element disposed in the twelfth electric path 1012 may contribute to shift the parasitic resonance frequency formed by the first conductive part ① and the third conductive part ③ in the folded state of the electronic device 2 out of the resonance frequency band of the antenna radiator including at least a portion of the first conductive part ①.

According to an embodiment, when an antenna is implemented by controlling the first switching circuit 710, the second switching circuit 720, and/or the third switching circuit 730, based on various environments such as a working frequency band and/or usage conditions of the electronic device 2 in the folded state, the processor 610 may control the fifth switching circuit 750. The processor 610 may control the fifth switching circuit 750 to optimize radiation conditions (or to increase the possibility of securing radio wave transmission/reception performance), based on various environments such as a working frequency band and/or usage conditions of the electronic device 2 in the folded state. For example, when an antenna is implemented by controlling the first switching circuit 710, the second switching circuit 720, and/or the third switching circuit 730, based on various environments such as a working frequency band and/or usage conditions of the electronic device 2 in the folded state, the fifth switching circuit 750 may be controlled such that the fourteenth electric path 1014 and the fifteenth electric path 1015 are electrically connected. As another example, when an antenna is implemented by controlling the first switching circuit 710, the second switching circuit 720, and/or the third switching circuit 730, based on various environments such as a working frequency band and/or usage conditions of the electronic device 2 in the folded state, the fifth switching circuit 750 may be controlled such that the fourteenth electric path 1014 and the fifteenth electric path 1015 are electrically disconnected. In an embodiment, based on various environments such as a working frequency band, and/or usage conditions, switching of the fifth switching circuit 750 may be configured in various other ways to optimize the radiation conditions (or to increase the possibility of securing radio wave transmission/reception performance). In an embodiment, the fifth switching circuit 750 may be controlled to reduce the effect of the fourth conductive part ④ on the antenna radiation performance of a radiation part (or antenna radiator) including at least a portion of the first conductive part ① or at least a portion of the second conductive part ②. For example, the fourth conductive part ④ may be electrically connected to the second ground G2 in the folded state of the electronic device 2, thereby reducing the effect of the fourth conductive part ④ on the antenna radiation performance of an antenna radiator including at least a portion of the second conductive part ②. For example, if the fourth conductive part ④ is electrically connected to the second ground G2 in the folded state of the electronic device 2, the parasitic resonance frequency formed due to the capacitance (or capacitance component) (e.g., parasitic capacitance) occurring between the second conductive part ② and the fourth conductive part ④ in the folded state of the electronic device 2 may not be included in the resonance frequency band of the antenna radiator including at least a portion of the second conductive part ②. In an embodiment, the electronic device 2 may further include a lumped element disposed in the fourteenth electric path 1014. The lumped element disposed in the fourteenth electric path 1014 may contribute to shift the parasitic resonance frequency formed by the second conductive part ② and the fourth conductive part ④ in the folded state of the electronic device 2 out of the resonance frequency band of the antenna radiator including at least a portion of the second conductive part ②.

The processor 610 may identify a spatial or positional relationship between the electronic device 2 and an external dielectric using the first sensor IC 910 and/or the second sensor IC 920. The first sensor IC 910 (e.g., a first capacitance sensor or a first grip sensor) may measure capacitance using the second conductive part ②, and the second sensor IC 920 (e.g., a second capacitance sensor or a second grip sensor) may measure capacitance using the third conductive part ③. For example, the electric field formed in the second conductive part ② may vary depending on a spatial or positional relationship between the electronic device 2 and an external dielectric such as a hand, and the first sensor IC 910 may measure the capacitance corresponding to a change in the electric field (or voltage drop). For example, the electric field formed in the third conductive part ③ may vary depending on a spatial or positional relationship between the electronic device 2 and an external dielectric such as a hand, and the second sensor IC 920 may measure the capacitance corresponding to a change in the electric field (or voltage drop).

The first sensor IC 910 may provide a signal (e.g., current) in a sensing frequency band to the second conductive part ②, and the second conductive part ② may form an electric field in the sensing frequency band. The second sensor IC 920 may provide a signal (e.g., current) in a sensing frequency band to the third conductive part ③, and the third conductive part ③ may form an electric field in the sensing frequency band. In an embodiment, an antenna radiator including at least a portion of the second conductive part ② may form a magnetic field in the sensing frequency band in the second conductive part ② when a current is supplied from the communication circuit 630.

The processor 610 may identify a usage condition corresponding to a spatial or positional relationship between the electronic device 2 and the external dielectric, based on the capacitance measured by the first sensor IC 910 and the capacitance measured by the second sensor IC 920. The processor 610, based on the spatial or positional relationship between the electronic device 2 and the external dielectric, may variably implement the antenna radiator (or radiation part) to increase the possibility of securing radio wave transmission/reception performance in the working frequency band. For example, the antenna radiator may be variably implemented depending on usage conditions of the electronic device 2 (e.g., a free state, a first grip state, or a second grip state). The memory 620 may store instructions that cause the processor 610 to control the first switching circuit 710, the second switching circuit 720, and/or the third switching circuit 730 so as to variably implement the antenna radiator, based on usage conditions of the electronic device 2. The method of variably implementing the antenna radiator depending on the usage conditions of the electronic device 2 may reduce the degradation of radio wave transmission/reception due to the external dielectric, and reduce the performance difference between various usage conditions (or usage environments).

The electronic device 2 may further include a band-reject filter disposed on the eleventh electric path 1011. The band-reject filter may separate the communication frequency band utilized by the antenna from the sensing frequency band utilized by the first sensor IC 910. Accordingly, the influence between the antenna and the first sensor IC 910 may be reduced to secure the antenna radiation performance of the antenna and the sensing performance of the first sensor IC 910. When the communication circuit 630 transmits and/or receives a frequency signal (e.g., an RF signal) in a corresponding frequency band through the antenna, the band-reject filter may perform operation such that a frequency signal is not substantially transmitted to the first sensor IC 910 through the eleventh electric path 1011. The band-reject filter may include, for example, an inductor disposed in series on the eleventh electric path 1011.

The electronic device 2 may fur include a first protective circuit (not shown) disposed on a first electric path 1001, a second electric path 1002, a third electric path 1003, a fourth electric path 1004, or a fifth electric path 1005. The first protective circuit may protect the user from direct current (DC) caused by the electronic device 2. The first protective circuit may prevent a DC current from flowing to the first conductive part ① and the second conductive part ②, thereby preventing electric shock to the user. In an embodiment, the electronic device 2 may further include a second protective circuit (not shown) disposed in the twelfth electric path 1012 or the fourteenth electric path 1014. The second protective circuit may prevent a DC current from flowing to the third conductive part ③ and the fourth conductive part ④, thereby preventing electric shock to the user. The protective circuit may include, for example, a varistor.

Figure 8:
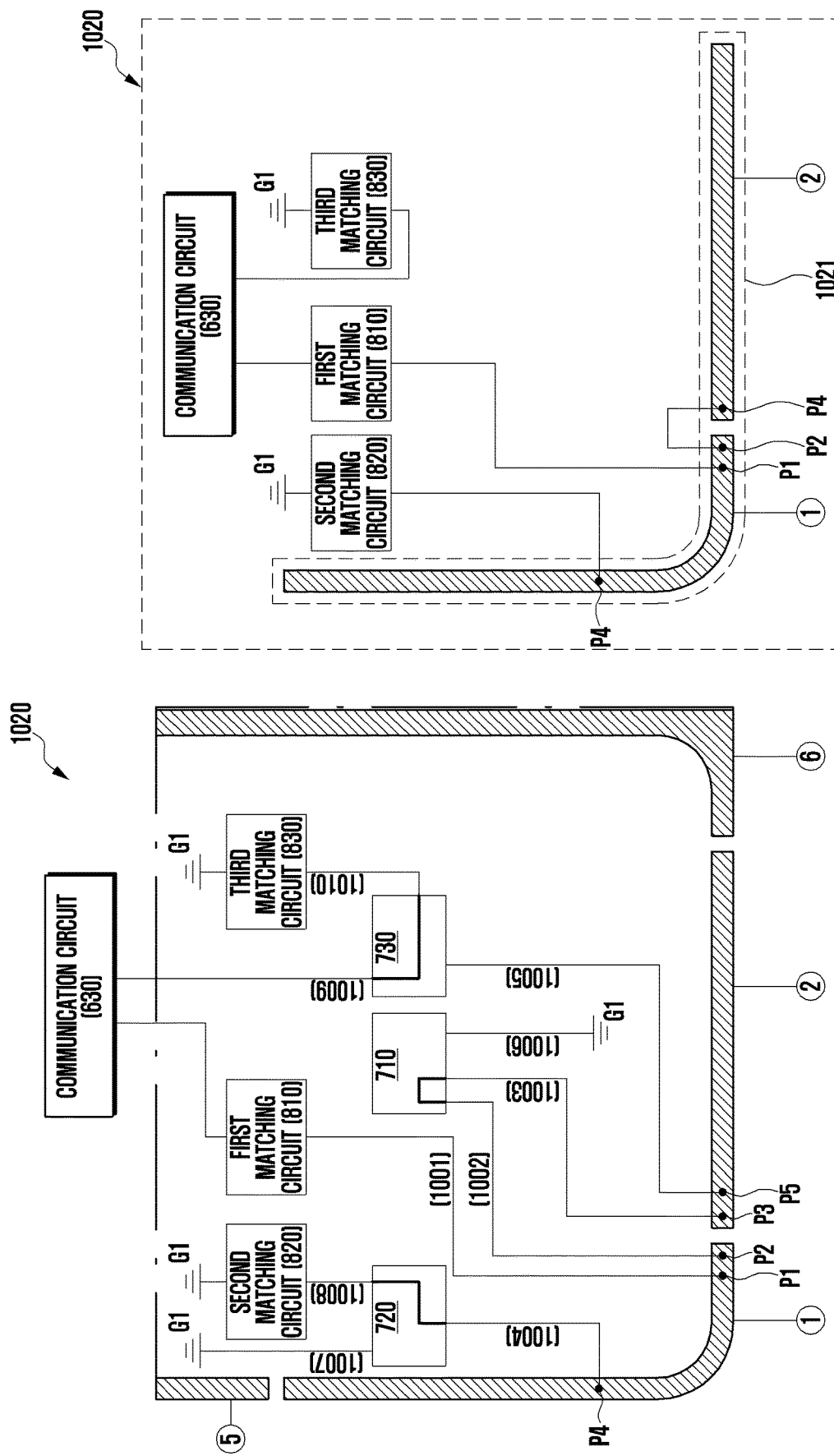
FIG. 8 is a block diagram of a first antenna implemented when an electronic device in a folded state is in a free state according to an embodiment.

FIG. 8 is a block diagram of a first antenna 1020 implemented when an electronic device 2 in a folded state is in a free state (not held by the user) according to an embodiment.

In the free state, the antenna 1020 is formed by the first conductive part ① and the second conductive part ② that are electrically connected to each other by first switching circuit 710. The first conductive part ① is connected to first matching circuit 1010 at point P1 and to second matching circuit at point P4 via second switching circuit 720.

Referring to FIG. 8, in an embodiment, when the electronic device 2 in the folded state is in a free state, the first switching circuit 710 may electrically connect the second electric path 1002 and the third electric path 1003 under the control of the processor 610 (see FIG. 5). When the electronic device 2 in the folded state is in the free state, the second switching circuit 720 may electrically connect the fourth electric path 1004 and the eighth electric path 1008 under the control of the processor 610. When the electronic device 2 in the folded state is in the free state, the third switching circuit 730 may electrically connect the ninth electric path 1009 and the tenth electric path 1010 under the control of the processor 610. The communication circuit 630 may provide a radiation current (or an electromagnetic signal) to the first point P1 (or a feeding portion). A radiation part (or antenna radiator) 1021 capable of emitting an electromagnetic signal fed to the first point P1 to the outside or receiving an electromagnetic signal from the outside may be formed. In an embodiment, the radiation part 1021 (e.g., the first radiation part R1 in FIG. 5) of the first antenna 1020 may include at least a portion of the first conductive part ① and at least a portion of the second conductive part ②. The first antenna 1020 may process a transmission signal or a reception signal in at least one selected or specified frequency band using, for example, the radiation part 1021. In an embodiment, the communication circuit 630 may process a transmission signal or a reception signal in the LB (e.g., about 600 MHz to about 1 GHz) using the radiation part 1021.

The first antenna 1020 may operate when the electronic device 2 operates in a stand-alone (SA) communication mode.

Figure 9:
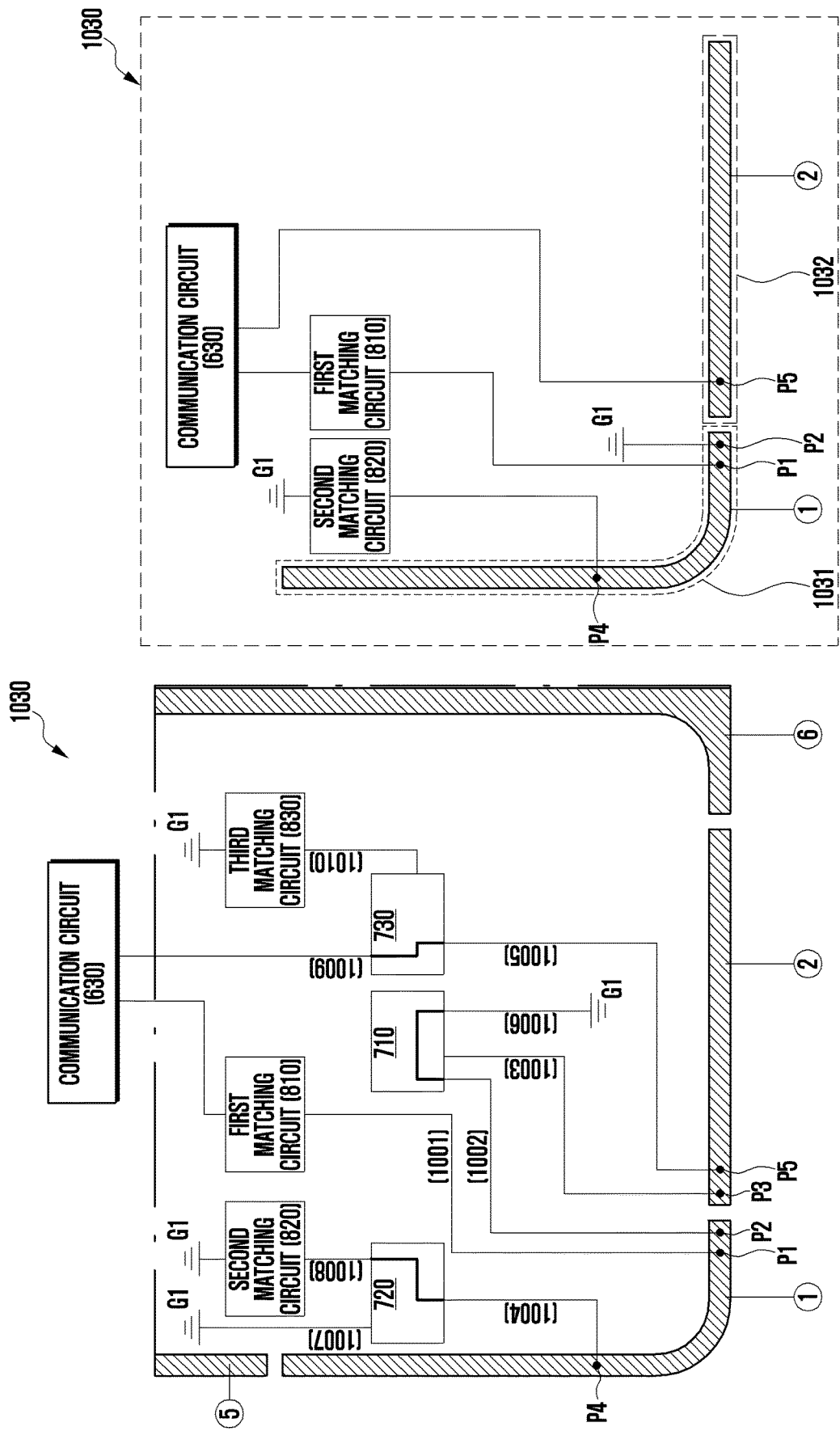
FIG. 9 is a block diagram of a second antenna implemented when an electronic device in a folded state is in a free state according to another embodiment.

FIG. 9 is a block diagram of a second antenna 1030 implemented when an electronic device 2 in a folded state is in a free state according to another embodiment. The first switching circuit 710 connects the first conductive part ① to ground. The second switching circuit 720 connects the first conductive part ① to the second matching circuit 620. The third switching circuit 730 connects the communication circuit 630 to the second conductive part ②.

Referring to FIG. 9, in an embodiment, when the electronic device 2 in the folded state is in a free state, the first switching circuit 710 may electrically connect the second electric path 1002 and the sixth electric path 1006 under the control of the processor 610 (see FIG. 5). When the electronic device 2 in the folded state is in the free state, the second switching circuit 720 may electrically connect the fourth electric path 1004 and the eighth electric path 1008 under the control of the processor 510. When the electronic device 2 in the folded state is in the free state, the third switching circuit 730 may electrically connect the fifth electric path 1005 and the ninth electric path 1009 under the control of the processor 610. The communication circuit 630 may provide a radiation current (or an electromagnetic signal) to the first point P1 (or a first feeding portion). A first radiation part (or first antenna radiator) 1031 (e.g., the first radiation part R2 in FIG. 5) capable of emitting an electromagnetic signal fed to the first point P1 to the outside or receiving an electromagnetic signal from the outside may be formed. The communication circuit 630 may provide a radiation current (or an electromagnetic signal) to the fifth point P5 (or a second feeding portion). A second radiation part (or second antenna radiator) 1032 capable of emitting an electromagnetic signal fed to the fifth point P5 to the outside or receiving an electromagnetic signal from the outside may be formed. In an embodiment, the first radiation part 1031 of the second antenna 1030 may include at least a portion of the first conductive part ①, and the second radiation part 1032 of the second antenna 1030 may include at least a portion of the second conductive part ②. For example, the communication circuit 630 may process a transmission signal or a reception signal in a first frequency band using the first radiation part 1031 and process a transmission signal or a reception signal in a second frequency band, which is different from the first frequency band, using the second radiation part 1032. In an embodiment, the first frequency band may include the LB (e.g., about 600 MHz to about 1 GHz), and the second frequency band may include the MB (e.g., about 1 GHz to about 2.3 GHz) or the HB (e.g., about 2.3 GHz to about 2.7 GHz).

The second antenna 1030 may operate when the electronic device 2 operates in a carrier aggregation (CA) communication mode.

Figure 10:
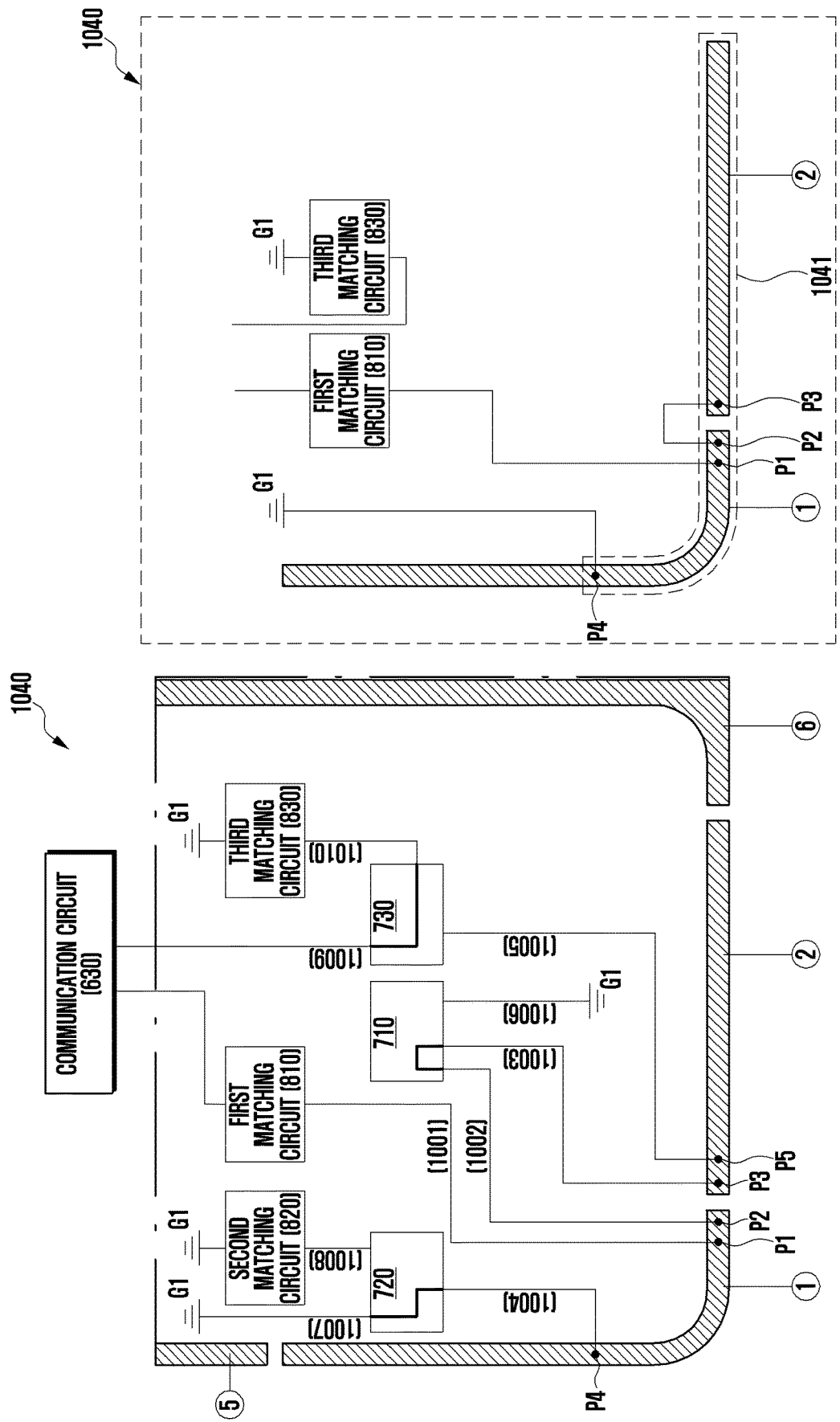
FIG. 10 is a block diagram of a third antenna implemented when an electronic device in a folded state is in a second usage condition in an embodiment.

FIG. 10 is a block diagram of a third antenna 1040 implemented when an electronic device 2 in a folded state is in a second grip state in an embodiment. The first switching circuit 710 connects the first conductive part ① to the second conductive part ② at points P2 and P3. The second switching circuit 720 connects the second conductive part ②, thereby grounding both the first conductive part ① to the second conductive part ②. The third switching circuit 730 connects the third matching circuit 630 to the communication circuit 630.

Referring to FIG. 10, in an embodiment, when the electronic device 2 in the folded state is in a second usage condition, the first switching circuit 710 may electrically connect the second electric path 1002 and the third electric path 1003 under the control of the processor 610 (see FIG. 5). When the electronic device 2 in the folded state is in a second grip state, the second switching circuit 720 may connect the fourth electric path 1004 and the seventh electric path 1007 under the control of the processor 610. When the electronic device 2 in the folded state is in the second grip state, the third switching circuit 730 may electrically connect the ninth electric path 1009 and the tenth electric path 1010 under the control of the processor 610. The communication circuit 630 may provide a radiation current (or an electromagnetic signal) to the first point P1 (or a feeding portion). A radiation part (or antenna radiator) 1041 capable of emitting an electromagnetic signal fed to the first point P1 to the outside or receiving an electromagnetic signal from the outside may be formed. In an embodiment, the radiation part 1041 (e.g., the first radiation part R3 in FIG. 5) of the third antenna 1040 may include a portion of the first conductive part ① and the second conductive part ②. The third antenna 1040 may process a transmission signal or a reception signal in at least one selected or specified frequency band using, for example, the radiation part 1041. In an embodiment, the communication circuit 630 may process a transmission signal or a reception signal in the LB (e.g., about 600 MHz to about 1 GHz) using the radiation part 1041.

Figure 11:
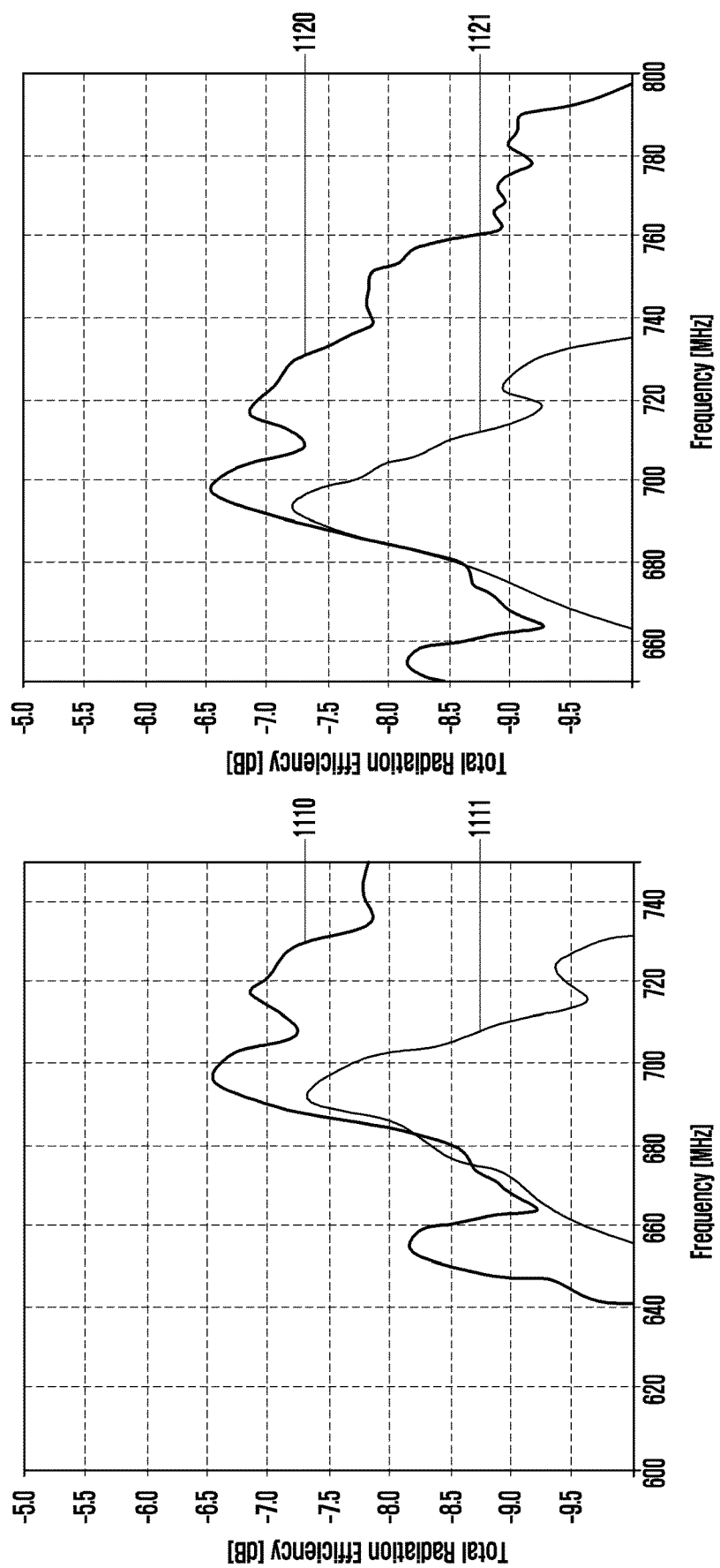
FIGS. 11 and 12 are graphs showing, for example, antenna radiation performance for the first antenna in FIG. 8 according to an embodiment and antenna radiation performance for an antenna according to a comparative example.
Figure 12:
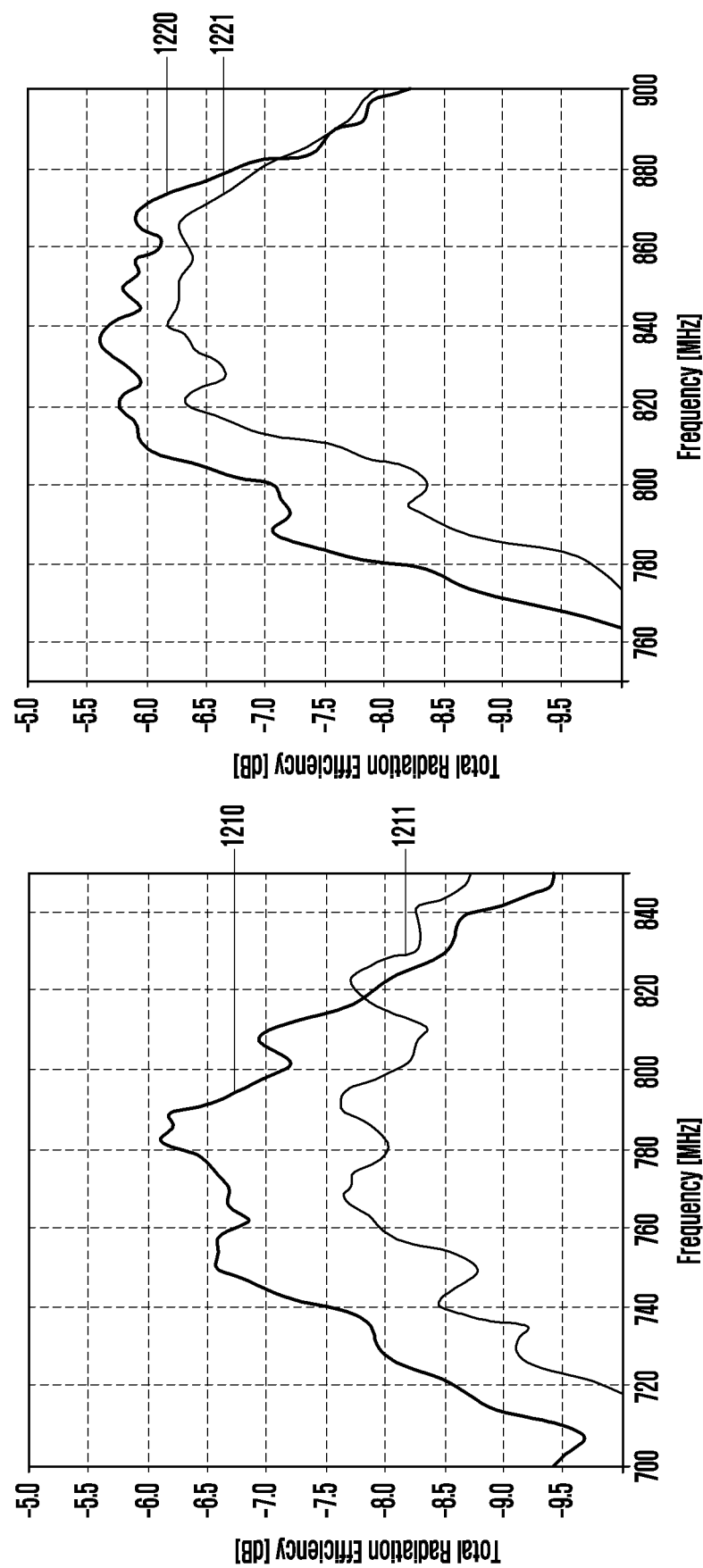

FIGS. 11 and 12 are graphs showing, for example, antenna radiation performance for the first antenna 1020 in FIG. 8 according to an embodiment and antenna radiation performance for an antenna according to a comparative example.

Referring to FIGS. 11 and 12, the graph indicated by the reference numeral "1110", "1120", "1210", or "1220" indicates antenna radiation performance when the first antenna 1020 (see FIG. 8) according to an embodiment transmits and/or receives a signal in a selected or specified frequency band (e.g., the LB (about 600 MHz to about 1 GHz)). The graph indicated by the reference numeral "1111", "1121", "1211", or "1221" indicates antenna radiation performance when an antenna according to a comparative example transmits and/or receives a signal in a selected or specified frequency band (e.g., the LB). The first antenna 1020 according to an embodiment may be operated when the electronic device 2 in the folded state is in the free state, and may have radiation part 1021 (see FIG. 8) including the first conductive part and the second conductive part ②. The antenna according to the comparative example may use the first conductive part as a radiation part when the electronic device in the folded state is in the free state. The first antenna 1020 according to an embodiment may have a more excellent antenna radiation performance than the antenna according to the comparative example because it is possible to secure a larger size of the radiation part than the same. The antenna of the comparative example is merely presented for comparison with the first antenna 1020 according to an embodiment, and it should be understood that the elements included in the antenna of the comparative example are included in the certain embodiments presented in this document and do not have an precedent over the certain embodiments of the document.

Table 2 below is, for example, a graph showing the antenna radiation performance for the third antenna 1040 in FIG. 10 according to an embodiment and the antenna radiation performance for the antenna according to a comparative example.

TABLE 2

| | Second grip state | Antenna radiation performance [dBm] in working frequency band | | | |
|---|---|---|---|---|---|
| | | About 600 MHz to about 740 MHz | About 660 MHz to about 800 MHz | About 700 MHz to about 840 MHz | About 760 MHz to about 1 GHz |
| Antenna of comparative example | Carrying by left hand | 0.9 | 2.1 | 3.3 | 5.2 |
| | Carrying by right hand | 8.8 | 5.4 | 6.2 | 6.3 |
| Third antenna 1040 according to embodiment | Carrying by left hand | 6.1 | 6 | 6.3 | 8.4 |
| | Performance improvement value compared to comparative example | 5.2 | 3.9 | 3 | 3.2 |
| | Carrying by right hand | 9.8 | 9.4 | 8.3 | 9.3 |
| | Performance improvement value compared to comparative example | 1 | 4 | 2.1 | 3 |

The third antenna 1040 (see FIG. 10) according to an embodiment may be operated when the electronic device 2 in the folded state is in the second grip state, and may have a radiation part 1041 including a portion of the first conductive part ① and the second conductive part ②. The antenna according to the comparative example may use the second conductive part ② as a radiation part when the electronic device in the folded state is in the second grip state. Referring to Table 2, the second antenna 1040 according to an embodiment may have a more excellent antenna radiation performance than the antenna according to the comparative example in the working frequency band (e.g., LB) because it is possible to secure a larger size of the radiation part than the same. The antenna of the comparative example is merely presented for comparison with the third antenna 1040 according to an embodiment, and it should be understood that the elements included in the antenna of the comparative example are included in the certain embodiments presented in this document and do not have an precedent over the certain embodiments of the document.

FIGS. 13, 14, 15, 16, 17, and 18 are diagrams illustrating other embodiments in which the embodiment in FIG. 5 is modified or changed according to certain embodiments.

Figure 13:
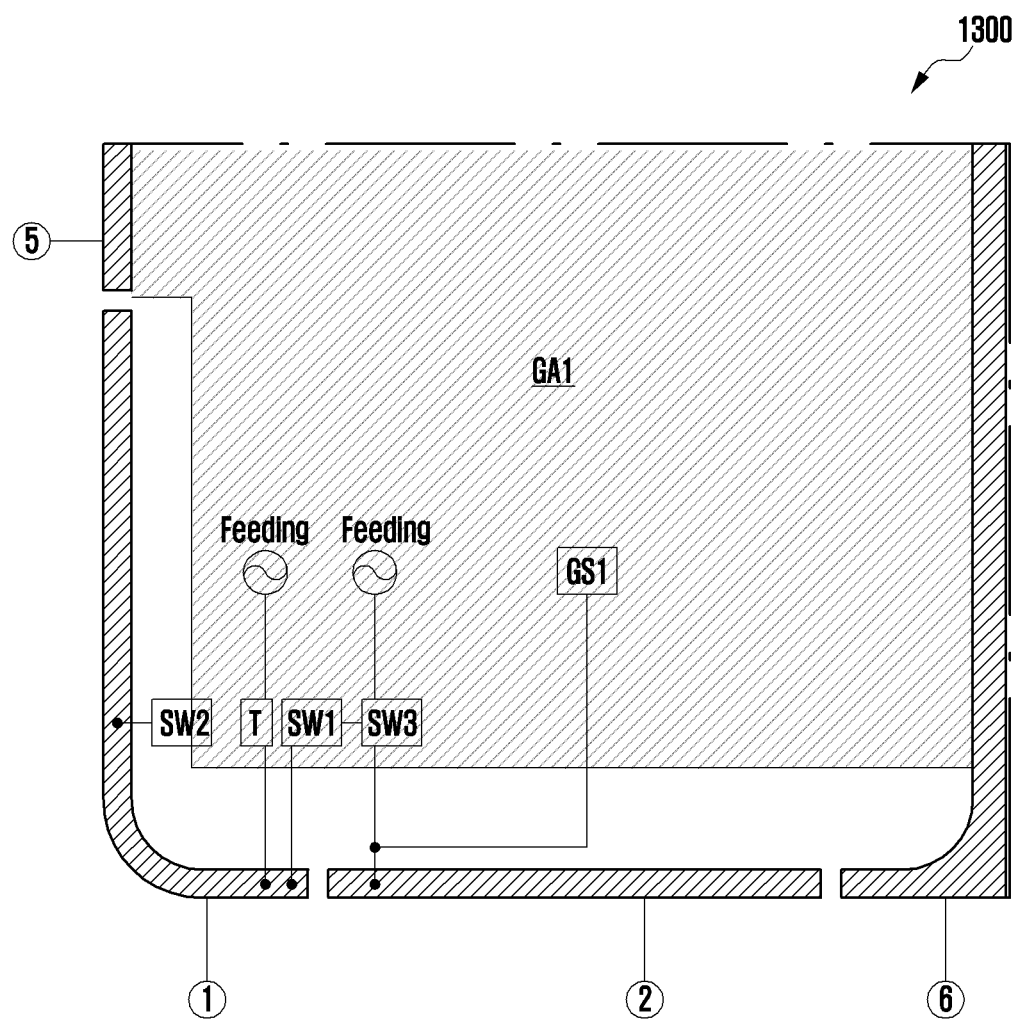
FIGS. 13, 14, 15, 16, 17, and 18 are diagrams illustrating other embodiments in which the embodiment in FIG. 5 is modified or changed according to certain embodiments.

The embodiment 1300 in FIG. 13 may be implemented such that the first switching circuit SW1 and the third switching circuit SW3 are electrically connected, compared to the embodiment in FIG. 5. The embodiment 1300 in FIG. 13 may be implemented by excluding the third electric path 1003 (see FIG. 7) that electrically connects the first switching circuit SW1 and the second conductive part ② from the embodiment in FIG. 5. In the embodiment 1300 in FIG. 13, the electronic device 2 may identify usage conditions of the electronic device 2 using the first grip sensor GS1 and/or the second grip sensor GS2 (see FIG. 5) and control the first switching circuit SW1, the second switching circuit SW2, and/or the third switching circuit SW3 according to the identified usage conditions. When the electronic device 2 controls the first switching circuit SW1, the second switching circuit SW2, and/or the third switching circuit SW3 according to the usage conditions, a portion that operates as an antenna radiator (or radiation part) may be determined from the first conductive part ① and the second conductive part ② to increase the possibility of securing radio wave transmission/reception performance in a working frequency band.

Figure 14:
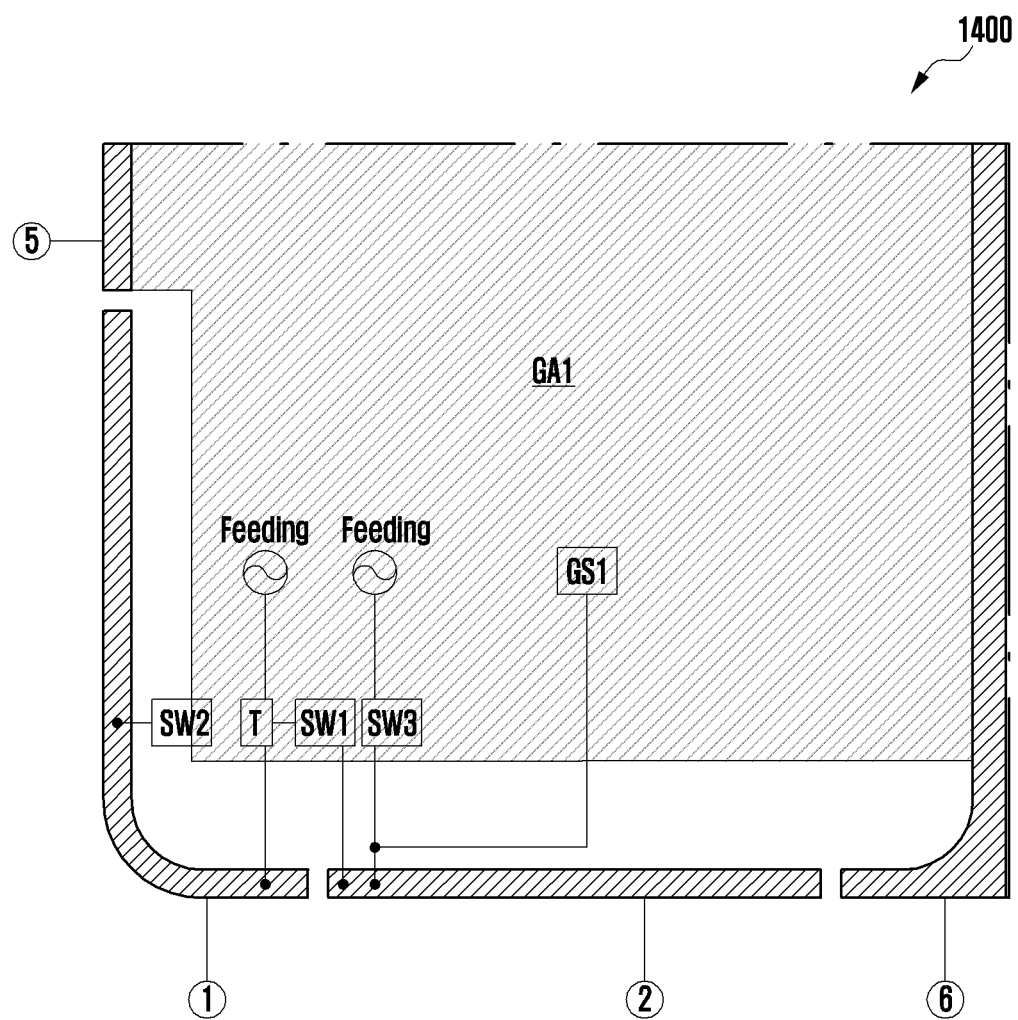

The embodiment 1400 in FIG. 14 may be implemented to electrically connect the tuner T and the first switching circuit SW1, compared to the embodiment in FIG. 5. The embodiment 1400 in FIG. 14 may be implemented by excluding the second electric path 1002 (see FIG. 7) that electrically connects the first switching circuit SW1 and the first conductive part from the embodiment in FIG. 5. In the embodiment 1400 in FIG. 14, the electronic device 2 may identify usage conditions of the electronic device 2 using the first grip sensor GS1 and/or the second grip sensor GS2 (see FIG. 5) and control the first switching circuit SW1, the second switching circuit SW2, and/or the third switching circuit SW3 according to the identified usage conditions. When the electronic device 2 controls the first switching circuit SW1, the second switching circuit SW2, and/or the third switching circuit SW3 according to the usage conditions, a portion that operates as an antenna radiator (or radiation part) may be determined from the first conductive part and the second conductive part ② to increase the possibility of securing radio wave transmission/reception performance in a working frequency band.

Figure 15:
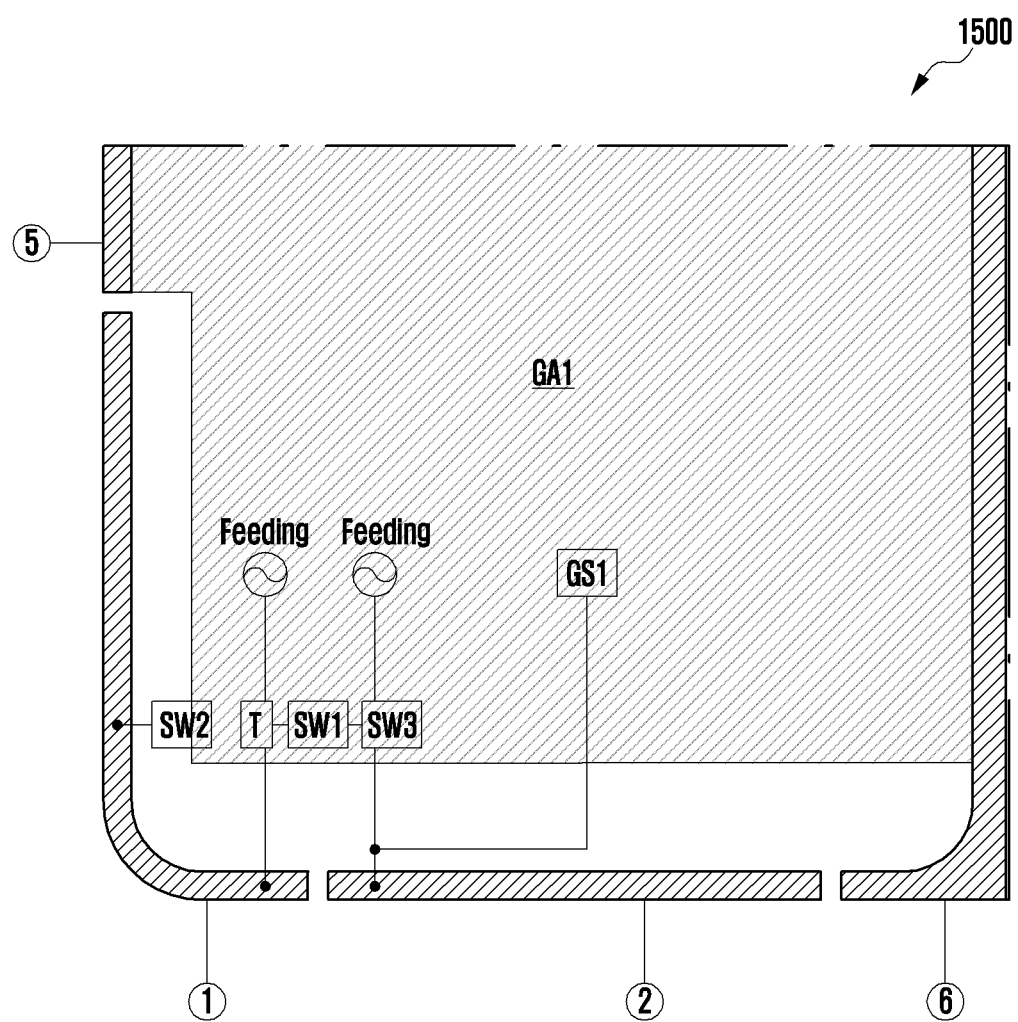

The embodiment 1500 in FIG. 15 may be implemented to electrically connect the first switching circuit SW1 to the tuner T and the third switching circuit SW3, compared to the embodiment in FIG. 5. The embodiment 1500 in FIG. 15 may be implemented by excluding the second electric path 1002 (see FIG. 7) that electrically connects the first switching circuit SW1 and the first conductive part ① from the embodiment in FIG. 5. The embodiment 1500 in FIG. 15 may be implemented by excluding the third electric path 1003 (see FIG. 7) that electrically connects the first switching circuit SW1 and the second conductive part ② from the embodiment in FIG. 5. In the embodiment 1500 in FIG. 15, the electronic device 2 may identify usage conditions of the electronic device 2 using the first grip sensor GS1 and/or the second grip sensor GS2 (see FIG. 5) and control the first switching circuit SW1, the second switching circuit SW2, and/or the third switching circuit SW3 according to the identified usage conditions. When the electronic device 2 controls the first switching circuit SW1, the second switching circuit SW2, and/or the third switching circuit SW3 according to the usage conditions, a portion that operates as an antenna radiator (or radiation part) may be determined from the first conductive part ① and the second conductive part ② to increase the possibility of securing radio wave transmission/reception performance in a working frequency band.

Figure 16:
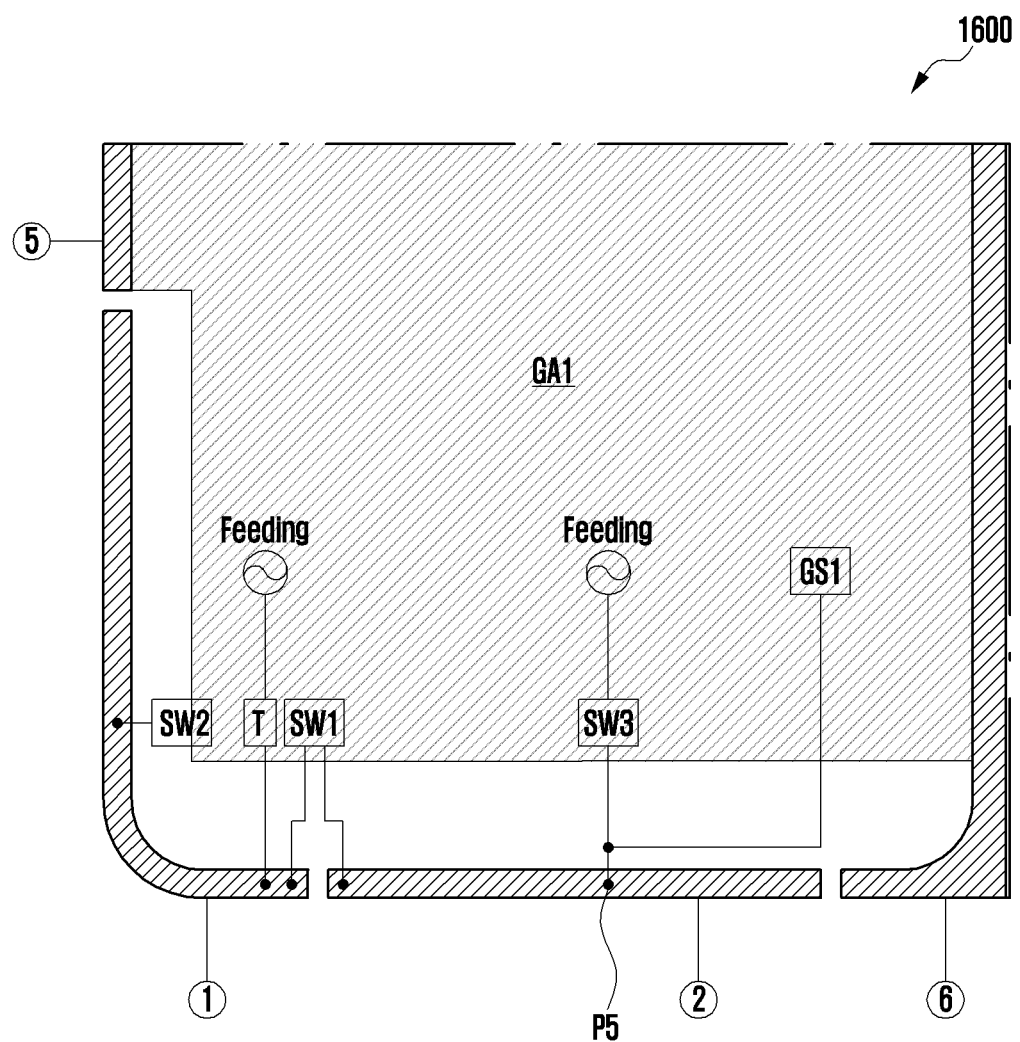

The embodiment 1600 in FIG. 16 may be implemented by changing the position of the fifth point P5 (e.g., the second feeding point or the second feeding portion), compared to the embodiment in FIG. 5. In the embodiment 1600 in FIG. 16, the electronic device 2 may identify usage conditions of the electronic device 2 using the first grip sensor GS1 and/or the second grip sensor GS2 (see FIG. 5) and control the first switching circuit SW1, the second switching circuit SW2, and/or the third switching circuit SW3 according to the identified usage conditions. When the electronic device 2 controls the first switching circuit SW1, the second switching circuit SW2, and/or the third switching circuit SW3 according to the usage conditions, a portion that operates as an antenna radiator (or radiation part) may be determined from the first conductive part ① and the second conductive part ② to increase the possibility of securing radio wave transmission/reception performance in a working frequency band.

Figure 17:
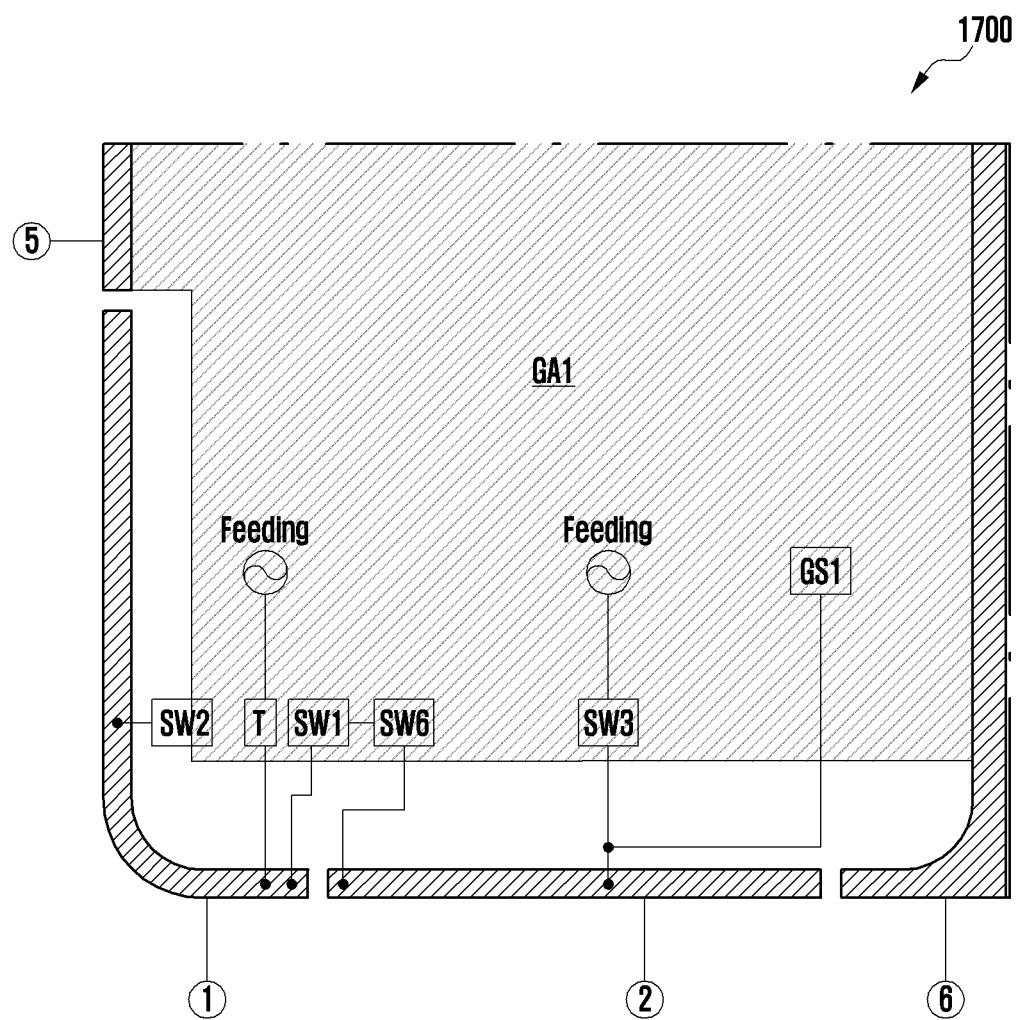

The embodiment 1700 in FIG. 17 may be implemented by further including a sixth switching circuit SW6 electrically connected to the first switching circuit SW1 and the second conductive part ②, compared to the embodiment in FIG. 16. The embodiment 1700 in FIG. 17 may be implemented by excluding the third electric path 1003 (see FIG. 7) that electrically connects the first switching circuit SW1 and the second conductive part ② from the embodiment in FIG. 5. In the embodiment 1700 in FIG. 17, the electronic device 2 may identify usage conditions of the electronic device 2 using the first grip sensor GS1 and/or the second grip sensor GS2 (see FIG. 5) and control the first switching circuit SW1, the second switching circuit SW2, the third switching circuit SW3, and/or the sixth switching circuit SW6 according to the identified usage conditions. When the electronic device 2 controls the first switching circuit SW1, the second switching circuit SW2, the third switching circuit SW3, and/or the sixth switching circuit SW6 according to the usage conditions, a portion that operates as an antenna radiator (or radiation part) may be determined from the first conductive part ① and the second conductive part ② to increase the possibility of securing radio wave transmission/reception performance in a working frequency band.

Figure 18:
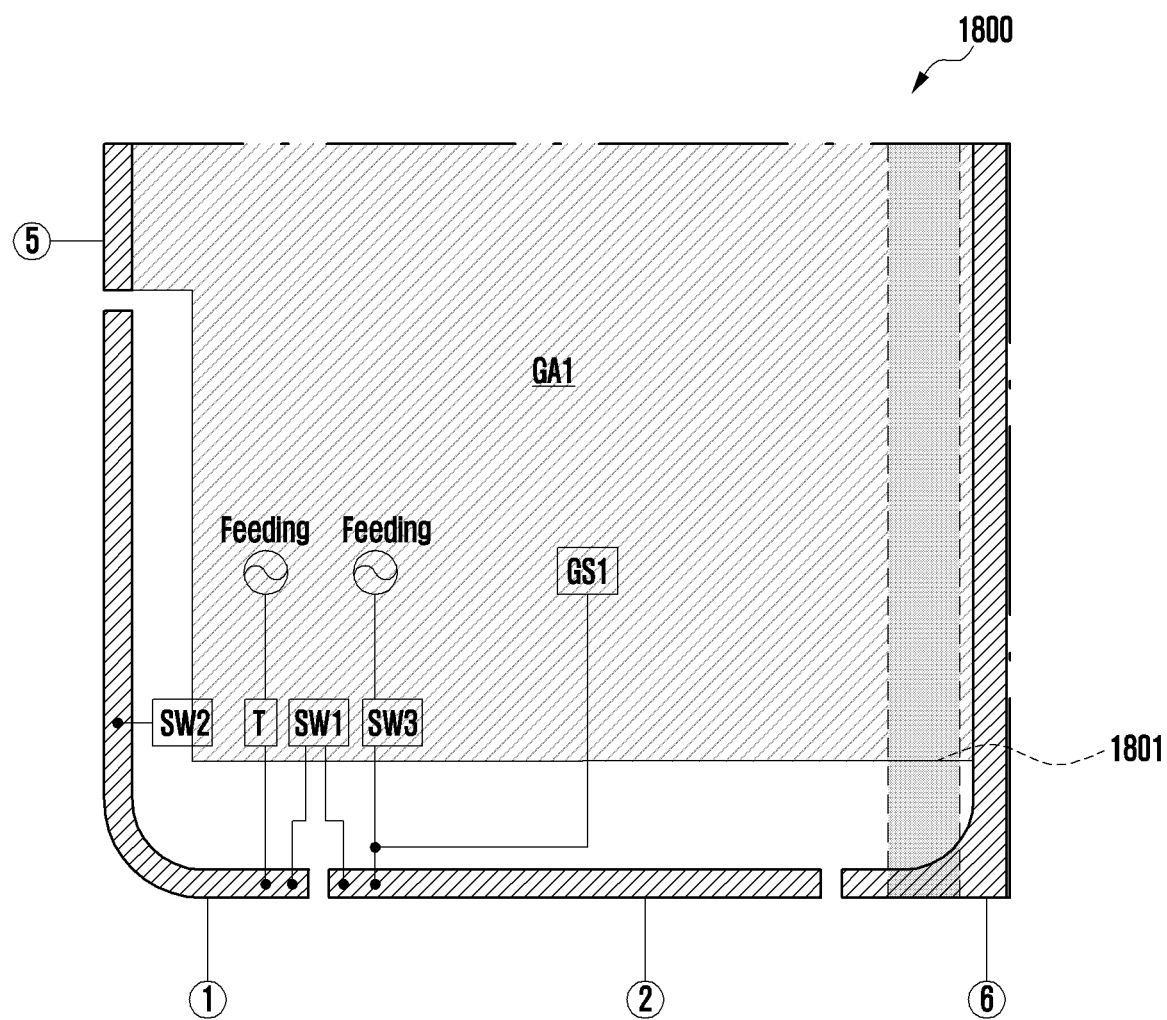

The embodiment 1800 in FIG. 18 may further include a pen input device (e.g., a stylus pen) 1801 that may be inserted into the first housing 21 (see FIG. 2), compared to the embodiment in FIG. 5. In order to reduce the electromagnetic effect of the first pen input device 1801 on a radiation part including at least a portion of the first conductive part ① and second conductive part ②, the pen input device 1801 may be inserted into the first housing 21 at a position spaced apart from the radiation part with an isolation degree capable of securing the antenna radiation performance of the radiation part.

According to an embodiment, the electronic device (e.g., the electronic device 2 in FIG. 2) may include a foldable housing (e.g., the foldable housing 20 in FIG. 2). The foldable housing may include a First housing (first housing 21 in FIG. 2) hingably connected to a second housing (second housing 22 in FIG. 2), a first side member (first side member 212 in FIG. 4) disposed about a side surface of the first housing and comprising a first plurality of conductive parts (conductive parts ①, ②, ③, ④, ⑤, ⑥, and ⑦), and a second side member of the (the second side member 222 in FIG. 4) about a side surface of the second housing and comprising a second plurality of conductive parts (conductive parts ⑧, ⑨, ⑩, ⑪, ⑫, ⑬, and ⑭). The electronic device may include a communication circuit (e.g., the communication circuit 630 in FIG. 7). The communication circuit may be electrically connected to a first conductive part (e.g., the first conductive part ① in FIG. 5) among the first plurality of conductive parts. The communication circuit may be configured to transmit and/or receive a signal in a selected or specified frequency band. The electronic device may include a first sensor IC (e.g., the first grip sensor GS1 in FIG. 5 or the first sensor IC 910 in FIG. 7). The first sensor IC may be electrically connected to at least one of the first plurality of conductive parts and measure capacitance. The electronic device may include a second sensor IC (e.g., the second grip sensor GS2 in FIG. 5 or the second sensor IC 920 in FIG. 7). The second sensor IC may be electrically connected to at least one (e.g., the third conductive part ③ in FIG. 5) of a second plurality of conductive parts and measure capacitance. The electronic device may include a first switching circuit (e.g., the first switching circuit SW1 in FIG. 5 or the first switching circuit 710 in FIG. 7) electrically connected to the first conductive part and the second conductive part (e.g., the second conductive part ② in FIG. 5), among the first plurality of conductive parts included in the first side member. The electronic device may include a processor (e.g., the processor 610 in FIG. 7) and a memory (e.g., the memory 620). The memory may store instructions that, when executed, cause the processor to perform a plurality of operations, the plurality of operations comprising controlling the first switching circuit wherein the first conductive part and the second conductive part are electrically connected, based on at least one of the capacitance measured by the first sensor IC and the capacitance measured by the second sensor IC when the foldable housing is in the folded state.

According to an embodiment, the memory may further store an instruction that, when executed, causes the processor to control the first switching circuit (e.g., the first switching circuit SW1 in FIG. 5 or the first switching circuit 710 in FIG. 7) such that the first conductive part (e.g., the first conductive part ① in FIG. 5) is electrically connected to a ground (e.g., the first ground area GA1 in FIG. 5 or the first ground G1 in FIG. 7) of the electronic device, based on at least one of the capacitance measured by the first sensor IC (e.g., the first grip sensor GS1 in FIG. 5 or the first sensor IC 910 in FIG. 7) and the capacitance measured by the second sensor IC (e.g., the second grip sensor GS2 in FIG. 5 or the second sensor IC 920 in FIG. 7) in the folded state of the foldable housing.

According to the embodiment, the plurality of operations may further comprise controlling the first switching circuit (e.g., the first switching circuit SW1 in FIG. 5 or the first switching circuit 710 in FIG. 7) to either electrically connect the first conductive part (e.g., the first conductive part ① in FIG. 5) to the second conductive part (e.g., the second conductive part ② in FIG. 5) or electrically connect the first conductive part to the ground (e.g., the first ground area GA1 in FIG. 5 or the first ground G1 in FIG. 7) based on a communication mode.

According to an embodiment, the plurality of operations may further comprise controlling the first switching circuit (e.g., the first switching circuit SW1 in FIG. 5 or the first switching circuit 710 in FIG. 7) to electrically connect the first conductive part (e.g., the first conductive part ① in FIG. 5) to the second conductive part (the second conductive part ② in FIG. 5) in a stand-alone (SA) communication mode, and controlling the first switching circuit to electrically connect the first conductive part to the ground (e.g., the first ground area GA1 in FIG. 5 or the first ground G1 in FIG. 7) in a carrier aggregation (CA) communication mode.

According to an embodiment, the foldable housing is foldable about a folding axis between the first housing and the second housing. The first conductive part (e.g., the first conductive part ① in FIG. 4) may be disposed on a corner (e.g., the first corner C1 in FIG. 5) of the first housing. The second conductive part (e.g., the second conductive part ② in FIG. 4) may be disposed on an edge of the first housing, parallel to the folding axis.

According to an example embodiment, the first sensor IC (e.g., the first grip sensor GS1 in FIG. 5 or the first sensor IC 910 in FIG. 7) may be electrically connected to the second conductive part (e.g., the second conductive part ② in FIG. 5).

According to an example embodiment of this document, each one of the plurality of first conductive parts (e.g., the first conductive part ①, the second conductive part ②, and the fifth conductive part ⑤, and the sixth conductive part ⑥ in FIG. 4) is aligned with a one of the second plurality of conductive parts (e.g., the third conductive part ③, the fourth conductive part ④, the seventh conductive part ⑦, and the eighth conductive part ⑧) when the foldable housing is in the folded state. The second sensor IC (e.g., the second grip sensor GS2 in FIG. 5 or the second sensor IC 920 in FIG. 7) may be electrically connected to a third conductive part (e.g., the third conductive part ③ in FIG. 5) that is not aligned with the second conductive part among the second plurality of conductive parts, when the foldable housing is in the folded state.

According to an embodiment, the electronic device may further include a second switching circuit (e.g., the second switching circuit SW2 in FIG. 5 or the second switching circuit 720 in FIG. 7) electrically connected to the first conductive part (e.g., the first conductive part ① in FIG. 5). The plurality of operations may further comprise controlling the second switching circuit to electrically connect the first conductive part directly to the ground (e.g., the first ground area GA1 in FIG. 5 or the first ground G1 in FIG. 7) of the electronic device, based on at least one of the capacitance measured by the first sensor IC (e.g., the first grip sensor GS1 in FIG. 5 or the first sensor IC 910 in FIG. 7) and the capacitance measured by the second sensor IC (e.g., the second grip sensor GS2 in FIG. 5 or the second sensor IC 920 in FIG. 7) when the foldable housing is in the folded state.

According to an embodiment, The plurality of operations may further comprise controlling a second switching circuit (e.g., the second switching circuit SW2 in FIG. 5 or the second switching circuit 720 in FIG. 7) such that the first conductive part (e.g., the first conductive part ① in FIG. 7) is electrically connected to the ground (e.g., the first ground area GA1 in FIG. 5 or the first ground G1 in FIG. 7) through a matching circuit (e.g., the second matching circuit 820 in FIG. 7), based on at least one of the capacitance measured by the first sensor IC (e.g., the first grip sensor GS1 in FIG. 5 or the first sensor IC 910 in FIG. 7) and the capacitance measured by the second sensor IC (e.g., the second grip sensor GS2 in FIG. 5 or the second sensor IC 920 in FIG. 7) when the foldable housing is in the folded state.

According to an embodiment, the electronic device may further include a third switching circuit (e.g., the third switching circuit SW3 in FIG. 5 or the third switching circuit 730 in FIG. 7) electrically connected to the communication circuit (e.g., the communication circuit 630 in FIG. 7), the second conductive part (e.g., the second conductive part ② in FIG. 5), and a ground (e.g., the first ground area GA1 in FIG. 5 or the first ground G1 in FIG. 7) of the electronic device. The plurality of operations may further comprise controlling the third switching circuit to electrically connect the second conductive part to the communication circuit or the ground, based on at least one of the capacitance measured by the first sensor IC (e.g., the first grip sensor GS1 in FIG. 5 or the first sensor IC 910 in FIG. 7) and the capacitance measured by the second sensor IC (e.g., the second grip sensor GS2 in FIG. 5 or the second sensor IC 920 in FIG. 7) when the foldable housing is in the folded state.

According to an embodiment, the electronic device may further include a matching circuit (e.g., the third matching circuit 830 in FIG. 7) disposed on an electric path (e.g., the tenth electric path 1010 in FIG. 7) configured to electrically connect the third switching circuit (e.g., the third switching circuit SW3 in FIG. 5 or the third switching circuit 730 in FIG. 7) and the ground (e.g., the first ground area GA1 in FIG. 5 or the first ground G1 in FIG. 7).

According to an embodiment, each one of the first plurality of conductive parts (e.g., the first conductive part ①, the second conductive part ②, and the fifth conductive part ⑤, and the sixth conductive part ⑥ in FIG. 4) is aligned with a one of the second plurality of conductive parts (e.g., the third conductive part ③, the fourth conductive part ④, the seventh conductive part ⑦, and the eighth conductive part ⑧ in FIG. 4) when the foldable housing is in the folded state. A third conductive part aligns with the first conductive part when the foldable housing is in the folded state, and may be electrically connected to a fourth switching circuit (e.g., the fourth switching circuit SW4 in FIG. 5 or the fourth switching circuit 740 in FIG. 7). A fourth conductive part aligns with the second conductive part when the foldable housing is in the folded state, the fourth conductive part electrically connected to a fifth switching circuit (e.g., the fifth switching circuit SW5 in FIG. 5 or the fifth switching circuit 750 in FIG. 7). The plurality of operations further comprising controlling the fourth switching circuit to electrically connect the third conductive part to the ground of the electronic device and control the fifth switching circuit to electrically connect the fourth conductive part to the ground when the foldable housing is in the folded state.

According to an embodiment, the electronic device may further include a matching circuit (e.g., the tuner T in FIG. 5 or the first matching circuit 810 in FIG. 7) disposed on an electric path (e.g., the first electric path 1001 in FIG. 7) and configured to connect the communication circuit (e.g., the communication circuit 630 in FIG. 7) and the first conductive part (e.g., the first conductive part ① in FIG. 7).

According to an embodiment, the electronic device may further include a band-reject filter. The band-reject filter may be disposed on an electric path (e.g., the eleventh electric path 1011 in FIG. 7) configured to connect the first sensor IC (e.g., the first grip sensor GS1 in FIG. 5 or the first sensor IC 910 in FIG. 7) and at least one conductive part (e.g., the second conductive part ② in FIG. 7) included in the first side member.

According to an embodiment, the selected or specified frequency band may include 600 MHz to 1 GHz.

According to an embodiment, an electronic device (e.g., the electronic device 2 in FIG. 2) may include a foldable housing (e.g., the foldable housing 20 in FIG. 2). The foldable housing may include a front surface (e.g., the front surface 20A in FIG. 2) of the electronic device, a rear surface (e.g., the rear surface 20B in FIG. 2) of the electronic device positioned on an opposite side of the front surface, and a side surface (e.g., the first side surface 20C and the second side surface 20D in FIG. 2) of the electronic device surrounding the space between the front surface and the rear surface. The foldable housing may be configured such that the front surface is folded inward about a folding axis (e.g., the folding axis A in FIG. 2). The foldable housing may include a side member providing the side surface, and a plurality of conductive parts (e.g., the first conductive part ①, the second conductive part ②, the third conductive part ③, the fourth conductive part ④, the fifth conductive part ⑤, the sixth conductive part ⑥, the seventh conductive part ⑦, and the eighth conductive part ⑧ in FIG. 4) disposed on the side surface, the plurality of conductive parts including a first conductive part, and second conductive part, and a third conductive part. The electronic device may include a communication circuit (e.g., the communication circuit 630 in FIG. 7). The communication circuit may be electrically connected to the first conductive part. The communication circuit may be configured to transmit and/or receive a signal in a selected or specified frequency band. The electronic device may include a first switching circuit (e.g., the first switching circuit SW1 in FIG. 5 or the first switching circuit 710 in FIG. 7) electrically connected to the first conductive part and the second conductive part. The electronic device may include a first sensor IC (e.g., the first grip sensor GS1 in FIG. 5 or the first sensor IC 910 in FIG. 7). The first sensor IC may be electrically connected to the second conductive part and may measure capacitance. The electronic device may include a second sensor IC (e.g., the second grip sensor GS2 in FIG. 5 or the second sensor IC 920 in FIG. 7). The second sensor IC may be electrically connected to a third conductive part, wherein the third conductive part is aligned with the second conductive part so as not to overlap the second conductive part, when the foldable housing is in the folded state, the second sensor IC may measure capacitance. The electronic device may include a processor (e.g., the processor 610 in FIG. 7) and a memory (e.g., the memory 620 in FIG. 7). The memory may store instructions that, when executed, cause the processor to perform a plurality of operations comprising controlling the first switching circuit to electrically connect the first conductive part to the second conductive part, based on at least one of the capacitance measured by the first sensor IC and the capacitance measured by the second sensor IC in the folded state of the foldable housing.

According to an embodiment, the plurality of operations may further comprise controlling the first switching circuit (e.g., the first switching circuit SW1 in FIG. 5 or the first switching circuit 710 in FIG. 7) such that the first conductive part (e.g., the first conductive part ① in FIG. 5) is electrically connected to a ground (e.g., the first ground area GA1 in FIG. 5 or the first ground G1 in FIG. 7) of the electronic device, based on at least one of the capacitance measured by the first sensor IC (e.g., the first grip sensor GS1 in FIG. 5 or the first sensor IC 910 in FIG. 7) and the capacitance measured by the second sensor IC (e.g., the second grip sensor GS2 in FIG. 5 or the second sensor IC 920 in FIG. 7) when the foldable housing is in the folded state.

According to an embodiment, the first conductive part (e.g., the first conductive part ① in FIG. 4) and the second conductive part (e.g., the second conductive part ② in FIG. 4) may be provided on one side of the side member, based on the folding axis (e.g., the folding axis A in FIG. 4). The third conductive part (e.g., the third conductive part ③ in FIG. 4) may be provided on the side member, on one side of the folding axis, and may be aligned with the first conductive part so as to overlap the first conductive part when the foldable housing is in the folded state.

According to an embodiment, the electronic device may further include a second switching circuit (e.g., the second switching circuit SW2 in FIG. 5 or the second switching circuit 720 in FIG. 7) electrically connected to the first conductive part (e.g., the first conductive part ① in FIG. 5). The plurality of operations may further comprise controlling the second switching circuit to either electrically connect the first conductive part to the ground (e.g., the first ground area GA1 in FIG. 5 or the first ground G1 in FIG. 7) of the electronic device bypassing a frequency-related element or electrically connect the first conductive part is electrically connected to the ground through a frequency-related element, based on at least one of the capacitance measured by the first sensor IC (e.g., the first grip sensor GS1 in FIG. 5 or the first sensor IC 910 in FIG. 7) and the capacitance measured by the second sensor IC (e.g., the second grip sensor GS2 in FIG. 5 or the second sensor IC 920 in FIG. 7) when the foldable housing is in the folded state.

According to an embodiment, the electronic device may further include a third switching circuit (e.g., the third switching circuit SW3 in FIG. 5 or the third switching circuit 730 in FIG. 7) electrically connected to the communication circuit (e.g., the communication circuit 630 in FIG. 7), the second conductive part (e.g., the second conductive part ② in FIG. 5), and a ground (e.g., the first ground area GA1 in FIG. 5 or the first ground G1 in FIG. 7) of the electronic device. The plurality of operations may further comprise controlling the third switching circuit to electrically connect that the second conductive part to the communication circuit or the ground, based on at least one of the capacitance measured by the first sensor IC (e.g., the first grip sensor GS1 in FIG. 5 or the first sensor IC 910 in FIG. 7) and the capacitance measured by the second sensor IC (e.g., the second grip sensor GS2 in FIG. 5 or the second sensor IC 920 in FIG. 7) when the foldable housing is in the folded state.

The embodiments disclosed in this document and drawings are merely presented as specific examples to easily explain technical content and help understanding of the embodiments, and are not intended to limit the scope of the embodiments. Therefore, the scope of certain embodiments of this document should be interpreted as encompassing changes or modifications of the embodiments disclosed herein in addition thereto.

The invention claimed is:

1. An electronic device comprising:
   a foldable housing comprising a first housing hingably connected to a second housing, a first side member disposed about a side surface of the first housing and comprising a first plurality of conductive parts, and a second side member disposed about a side surface of the second housing and comprising a second plurality of conductive parts;
   a communication circuit electrically connected to a first conductive part among the first plurality of conductive parts and configured to transmit and receive a signal in a selected or specified frequency band;
   a first sensor integrated circuit (IC) electrically connected to at least one of the first plurality of conductive parts and configured to measure capacitance;
   a second sensor IC electrically connected to at least one of the second plurality of conductive parts and configured to measure capacitance;
   a first switching circuit electrically connected to the first conductive part and a second conductive part among the first plurality of conductive parts;
   a second switching circuit electrically connected to the first conductive part; and
   a processor and a memory,
   wherein the memory stores instructions that, when executed, cause the processor to perform a plurality of operations, the plurality of operations comprising:
   controlling the first switching circuit to electrically connect the first conductive part and the second conductive part, based on at least one of the capacitance measured by the first sensor IC and the capacitance measured by the second sensor IC when the foldable housing is in a folded state, and
   controlling the second switching circuit to electrically connect the first conductive part directly to a ground of the electronic device, based on at least one of the capacitance measured by the first sensor IC and the capacitance measured by the second sensor IC when the foldable housing is in the folded state.

2. The electronic device of claim 1, wherein the plurality of operations further comprises:
   controlling the first switching circuit such that the first conductive part is electrically connected to the ground of the electronic device, based on at least one of the capacitance measured by the first sensor IC and the capacitance measured by the second sensor IC in the folded state of the foldable housing.

3. The electronic device of claim 2, wherein the plurality of operations further comprises:
   controlling the first switching circuit to either electrically connect the first conductive part to the second conductive part or electrically connect the first conductive part to the ground, based on a communication mode.

4. The electronic device of claim 3, wherein the plurality of operations further comprises controlling the first switching circuit to electrically connect the first conductive part to the second conductive part in a stand-alone (SA) communication mode and controlling the first switching circuit to electrically connect the first conductive part to the ground in a carrier aggregation (CA) communication mode.

5. The electronic device of claim 1, wherein the foldable housing is foldable about a folding axis between the first housing and the second housing,
   wherein the first conductive part is disposed on a corner of the first housing, and
   wherein the second conductive part is disposed on an edge of the first housing, parallel to the folding axis.

6. The electronic device of claim 1, wherein the first sensor IC is electrically connected to the second conductive part.

7. The electronic device of claim 6, wherein each one of the first plurality of conductive parts is aligned with a one of the second plurality of conductive parts when the foldable housing is in the folded state, and
   wherein the second sensor IC is electrically connected to a third conductive part among the second plurality of conductive parts that is not aligned with the second conductive part when the foldable housing is in the folded state.

8. The electronic device of claim 1, wherein the plurality of operations further comprises controlling a second switching circuit to electrically connect the first conductive part to the ground through a matching circuit, based on at least one of the capacitance measured by the first sensor IC and the capacitance measured by the second sensor IC when the foldable housing is in the folded state.

9. The electronic device of claim 1, further comprising a third switching circuit electrically connected to the communication circuit, the second conductive part, and the ground of the electronic device,
   wherein the plurality of operations further comprises controlling the third switching circuit to electrically connect the second conductive part to either the communication circuit or the ground, based on at least one of the capacitance measured by the first sensor IC and the capacitance measured by the second sensor IC when the foldable housing is in the folded state.

10. The electronic device of claim 9, further comprising a matching circuit disposed on an electric path that is configured to electrically connect the third switching circuit and the ground.

11. The electronic device of claim 1, wherein each one of the first plurality of conductive parts is aligned with a one of the second plurality of conductive parts are when the foldable housing is in the folded state, wherein a third conductive part among the second plurality of conductive parts is aligned with the first conductive part, the third conductive part electrically connected to a fourth switching circuit,
   wherein a fourth conductive part of the second plurality of conductive parts is aligned with the second conductive part, the fourth conductive part electrically connected to a fifth switching circuit, and
   wherein the plurality of operations further comprises controlling the fourth switching circuit to electrically connect the third conductive part to the ground of the electronic device and controlling the fifth switching circuit to electrically connect the fourth conductive part to the ground when the foldable housing is in the folded state.

12. The electronic device of claim 1, further comprising a matching circuit disposed on an electric path and configured to connect the communication circuit and the first conductive part.

13. The electronic device of claim 1, further comprising a band-reject filter disposed on an electric path that is configured to connect the first sensor IC and at least one conductive part among the first plurality of conductive parts.

14. The electronic device of claim 1, wherein the selected or specified frequency band comprises 600 MHz to 1 GHz.

* * * * *